(12) United States Patent
Tomizawa et al.

(10) Patent No.: US 8,194,019 B2
(45) Date of Patent: Jun. 5, 2012

(54) COLOR SIGNAL CONVERTER, DISPLAY UNIT, COLOR SIGNAL CONVERSION PROGRAM, COMPUTER-READABLE STORAGE MEDIUM STORING COLOR SIGNAL CONVERSION PROGRAM, AND COLOR SIGNAL CONVERSION METHOD

(75) Inventors: Kazunari Tomizawa, Kyoto (JP); Kozo Nakamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1440 days.

(21) Appl. No.: 11/081,696

(22) Filed: Mar. 17, 2005

(65) Prior Publication Data

US 2005/0206979 A1 Sep. 22, 2005

(30) Foreign Application Priority Data

Mar. 18, 2004 (JP) ................................ 2004-079258
Feb. 21, 2005 (JP) ................................ 2005-044669

(51) Int. Cl.
*G09G 3/36* (2006.01)
(52) U.S. Cl. ......................................... 345/88; 345/690
(58) Field of Classification Search .................... 345/88, 345/694, 518, 690; 358/518
See application file for complete search history.

(56) References Cited

U.S. PATENT DOCUMENTS

| 6,097,367 | A | 8/2000 | Kuriwaki et al. | |
| 6,594,387 | B1 | 7/2003 | Pettitt et al. | |
| 6,621,497 | B1 * | 9/2003 | Sugiura et al. | 345/600 |
| 6,870,523 | B1 | 3/2005 | Ben-David et al. | |
| 7,268,757 | B2 * | 9/2007 | Ben-David et al. | 345/88 |
| 2002/0122019 | A1 * | 9/2002 | Baba et al. | 345/88 |
| 2003/0117414 | A1 | 6/2003 | Sasaki | |
| 2004/0046725 | A1 * | 3/2004 | Lee | 345/88 |
| 2004/0100589 | A1 | 5/2004 | Ben-David et al. | |
| 2004/0246345 | A1 | 12/2004 | Ohsawa et al. | |
| 2005/0083345 | A1 * | 4/2005 | Higgins | 345/600 |
| 2005/0083352 | A1 * | 4/2005 | Higgins | 345/690 |
| 2006/0146066 | A1 | 7/2006 | Sasaki | |
| 2007/0024529 | A1 | 2/2007 | Ben-David et al. | |

FOREIGN PATENT DOCUMENTS

| CN | 1428763 | 7/2003 |
| CN | 1444757 | 9/2003 |
| JP | 64-012382 | 1/1989 |
| JP | 06-261332 A | 9/1994 |
| JP | 11-146210 | 5/1999 |

(Continued)

OTHER PUBLICATIONS

M.R. Pointer, "The Gamut of Real Surface Colours", COLOR research and application vol. 5, No. 3, Fall (1980), p. 145-155.

*Primary Examiner* — Yong H Sim
(74) *Attorney, Agent, or Firm* — Harness, Dickey & Pierce, P.L.C.

(57) ABSTRACT

A color conversion circuit converts a three-primary-color signal PS0 to a 5-color signal PS5, and includes (i) a color component extraction module that generates, by performing isochromatic conversion, a 7-color signal PS2 made up of 7 color components equivalent in terms of color to color components d1 through d5 of the 5-color signal PS5, and (ii) a matrix operation module that generates color components of the 5-color signal by performing linear combination of the color components of the 7-color signal. With this, it is possible to realize a color conversion circuit by which colors represented by a signal after conversion can be adjusted using intuitively-understandable parameters.

24 Claims, 10 Drawing Sheets

| | FOREIGN PATENT DOCUMENTS | |
|---|---|---|
| JP | 2000-358252 | 12/2000 |
| JP | 2001-111854 A | 4/2001 |
| JP | 2001-306023 A | 11/2001 |
| JP | 2002-287247 | 10/2002 |
| JP | 2003-134351 A | 5/2003 |
| WO | WO 01/95544 | 12/2001 |
| WO | WO 02/099557 A2 | 12/2002 |

* cited by examiner

COLOR ADJUSTMENT OF AREAS

COLOR SIGNAL CONVERTER, DISPLAY UNIT, COLOR SIGNAL CONVERSION PROGRAM, COMPUTER-READABLE STORAGE MEDIUM STORING COLOR SIGNAL CONVERSION PROGRAM, AND COLOR SIGNAL CONVERSION METHOD

This Nonprovisional application claims priority under 35 U.S.C. §119(a) on Patent Application No. 2004-79258 filed in Japan on Mar. 18, 2004 and Patent Application No. 2005-44669 filed in Japan on Feb. 21, 2005, the entire contents of which are hereby incorporated by reference.

FIELD OF THE INVENTION

The present invention relates to signal processing for processing a color video signal and the like, and particularly relates to color signal conversion by which a trichromatic (three-primary-color) signal is converted to a color signal corresponding to not less than four colors. The present invention also relates to a color display apparatus and color display method for displaying color images.

BACKGROUND OF THE INVENTION

Color display apparatuses (display apparatuses) such as color TV sets and color monitors typically reproduce colors by subjecting RGB primary colors to additive color mixing. A typical example of a video signal supplied to such display apparatuses is a three-dimensional (e.g. RGB and YCrCb) color video signal (video signal).

In the meanwhile, a display apparatus that subjects not less than four primary colors to the additive color mixing has also been proposed. A video signal supplied to such a display apparatus is typically required to be made up of primary-color signals corresponding to the respective primary colors reproduced by the display apparatus. This type of video signal, however, is not in widespread use, and hence it is necessary to specially generate such a video signal.

For this reason, there are needs for a technology to convert a widely-used video signal made up of three primary-color signals to a video signal made up of multi-primary-color signals corresponding to not less than four primary colors.

According to Japanese Laid-Open Patent Application No. 6-261332/1994 (published on Sep. 16, 1994; Patent Document 1), for instance, a multi-primary-color video signal is obtained in such a manner that, (i) it is identified where an RGB three-primary-color video signal having been supplied locates on a chromaticity diagram, (ii) in accordance with the result of the identification, three primary colors are suitably selected from more than three primary colors, and (iii) a linear combination of the selected primary colors is obtained.

The technology taught by Patent Document 1 can realize relatively precise color reproduction, because parameter coefficients are worked out after spreading RGB colors on the chromaticity diagram. In this technology, however, since the coefficients are not intuitively understandable, the parameters cannot be easily adjusted. This technology is therefore hardly practical.

SUMMARY OF THE INVENTION

An objective of the present invention is to provide a color signal converter that realizes, by means of intuitively-understandable parameters, the adjustment of colors represented by a signal after the conversion.

Another objective of the present invention is to provide a color display apparatus that can reproduce an image with a sufficient brightness even if the brightness of pixels is insufficient.

A color signal conversion apparatus of the present invention, which converts a three-primary-color signal to an n-color signal ($n \geq 4$), comprises: a first color signal generation module for generating, by subjecting the three-primary-color signal to isochromatic conversion, an m-color signal made up of m color components ($m \geq n$) including respective color components that are equivalent in terms of color to color components of the n-color signal; and a second color signal generation module for generating the color components of the n-color signal, by performing linear combination of the color components of the m-color signal.

A color signal conversion method of the present invention, for converting a three-primary-color signal to an n-color signal ($n \geq 4$), comprises the steps of: generating, by subjecting the three-primary-color signal to isochromatic conversion, an m-color signal made up of m color components ($m \geq n$) including respective color components that are equivalent in terms of color to color components of the n-color signal; and generating the color components of the n-color signal, by performing linear combination of the color components of the m-color signal.

According to the above-described arrangement and method, a three-primary-color signal that is an original signal is subjected to isochromatic conversion, generating an m-color signal made up of m color components ($m \geq n$) which are equivalent in terms of color with color components of a targeted n-color signal. The isochromatic conversion is performed in such a manner that a combination of color components representing a particular color is converted to a combination of other color components, without changing the represented color. The color components having equivalent colors are two color components whose positions on a chromaticity diagram are relatively close to each other and which are sensed as similar colors. The color components having equivalent colors include two identical color components whose positions on the chromaticity diagram are identical with each other.

According to the above-described arrangement and method, furthermore, the color components of the n-color signal generated as a result of the conversion are generated by the linear combination of the color components of the m-color signal generated as above. The linear combination of the color components is performed in such a manner that multiplication of coefficients and addition are performed with respect to each color component.

When the color components of the n-color signal are generated by the linear combination of the color components of the m-color signal, intuitively-understandable parameters are used for adjusting the colors represented by the n-color signal, and the coefficients of the linear combination are determined by simple calculations of these parameters (see Tables. 1-8). As the parameters, it is possible to adopt, for instance, values (cf. Tables 2, 4, and 6) indicating hue, color saturation, and brightness of each color component of the m-color signal or n-color signal and the values (cf. Table. 8) that indicate, in a neutral color between the color components, which one of the color components is enhanced.

In this manner, the above-described arrangement and method makes it possible to perform the adjustment of colors represented by the n-color signal after the conversion, by means of intuitively-understandable parameters.

A display unit of the present invention includes one of the foregoing color signal conversion apparatuses and a display panel having n-color pixels corresponding to the color components of the n-color signal.

According to this arrangement, it is possible to realize a display unit in which displayed colors can be adjusted using intuitively-understandable parameters.

A color signal conversion program of the present invention realizes, by a computer, one of the foregoing color signal conversion apparatuses. This color signal conversion program can be implemented as a program for causing a computer to operate as the aforesaid module. A computer-readable storage medium of the present invention can store the aforesaid color signal conversion program.

A color display apparatus of the present invention, for displaying a color image, comprises: n-color pixels corresponding to n color components (n≧4) of which the color image is made up, wherein, said n color components include a first color component, a second color component, and a third color component obtained by performing color mixing of the first and second color components, and in a case where the third equivalent color component of the m-color signal is reproduced by the display panel, auxiliary illumination by means of pixels corresponding to the first and second color components is performed in order to enhance illumination by a pixel corresponding to the third color component.

A color display method for displaying a color image is arranged in such a manner that n-color pixels corresponding to n color components (n≧4) of which the color image is made up is used, said n color components include a first color component, a second color component, and a third color component obtained by performing color mixing of the first and second color components, and in a case where the third equivalent color component of the m-color signal is reproduced, auxiliary illumination by means of pixels corresponding to the first and second color components is performed in order to enhance illumination by a pixel corresponding to the third color component.

According to the above-described arrangement and method, the pixels corresponding to the first and second color components perform the auxiliary illumination, so that the third component is obtained as a result of the color mixing, and the illumination of the pixel corresponding to the third color component is enhanced. With this, even when the brightness of the pixel corresponding to the third color component is insufficient, the third color component is reproduced with a sufficient brightness.

For a fuller understanding of the nature and advantages of the invention, reference should be made to the ensuing detailed description taken in conjunction with the accompanying drawings.

DESCRIPTION OF THE EMBODIMENTS

[Embodiment 1]

The following will describe Embodiment 1 of the present invention in reference to FIGS. 1-6.

(Preconditions)

In the present embodiment, an input video signal is made up of R, G, and B primary-color signals with X gray levels (black (0) to white (X-1)). That is to say, the input video signal is a 3x-bit color digital video signal made up of: an x-bit digital signal R with X gray levels (X=2x), which represents a red gray level by an integer (gray level value) r in the range of 0 to (X-1); an x-bit digital color signal G with X gray levels (X=2x), which represents a green gray level by an integer g in the range of 0 to (X-1); and an x-bit digital signal B with X gray levels, which represents a blue gray level by an integer (gray level value) b in the range of 0 to (X-1).

The video signal of the present embodiment may represent a moving image or a static image.

In the present embodiment, the r, g, and b gray levels are divided by (2x-1) so as to be converted to standardized values that fall in the range of (0≦r, g, b≦1).

The above-described preconditions are applicable to Embodiments 2 and 3 as well.

(Configuration of Apparatus)

Figure 1:
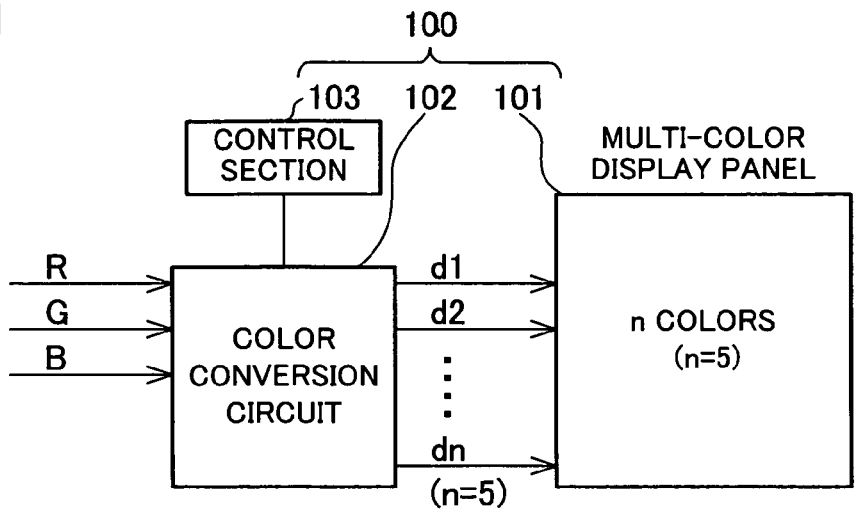
FIG. 1 is a block diagram showing a color display apparatus of Embodiment 1 of the present invention.

As shown in FIG. 1, a color display apparatus 100 of the present embodiment includes a multicolor display panel 101, a color conversion circuit 102, and a control section 103.

The above-mentioned "multicolor display" indicates color image reproduction realized by suitably mixing not less than four basic display colors (basic colors). Also, "multicolor display panel" is a display panel that realizes the multicolor display by means of pixels corresponding to the basic colors.

The present embodiment assumes that 5 basic colors are used in the multicolor display panel 101. In this respect, in the present embodiment, the multicolor display panel 101 may be at times termed 5-color display panel 101.

It is noted that any types of devices can be used as the multicolor display panel 101, on condition that the device can perform multicolor display. Examples of such devices include a liquid crystal display panel, a CRT, a PDP, and a liquid crystal projector.

A video signal supplied to the color display apparatus 100 is a three-primary-color signal representing R (red), G (green) and B (blue). This video signal is converted, by the color conversion circuit 102, into a video signal d1 through d5 used in the 5-color display panel 101, and the video signal d1 through d5 is supplied to the 5-color display panel 101.

In the color display apparatus 100, colors of an image displayed on the 5-color display panel 101 can be adjusted. This adjustment is instructed by the user through the control section 103. The control section 103 receives such an instruction, and supplies, to the color conversion circuit 102, an adjustment signal corresponding to the instruction. In accordance with the adjustment signal supplied from the control section 103, the color conversion circuit 102 adjusts the video signal. This adjustment of the video signal by the color conversion circuit 102 will be specifically described later.

Although the present embodiment assumes that the video signal supplied to the color display apparatus 100 represents three primary colors of R, G, and B, the video signal may represent another type of three primary colors such as YMC (Yellow, Magenta, and Cyan). Moreover, the video signal supplied to the color display apparatus 100 does not have to represent the aforesaid primary colors. The video signal may be, for instance, a signal that can be converted to three primary color signals, such as a YCrCb signal typically used as a color television signal. In such a case, an arrangement for converting the YCrCb signal to a three-primary color video signal is required.

Figure 2:
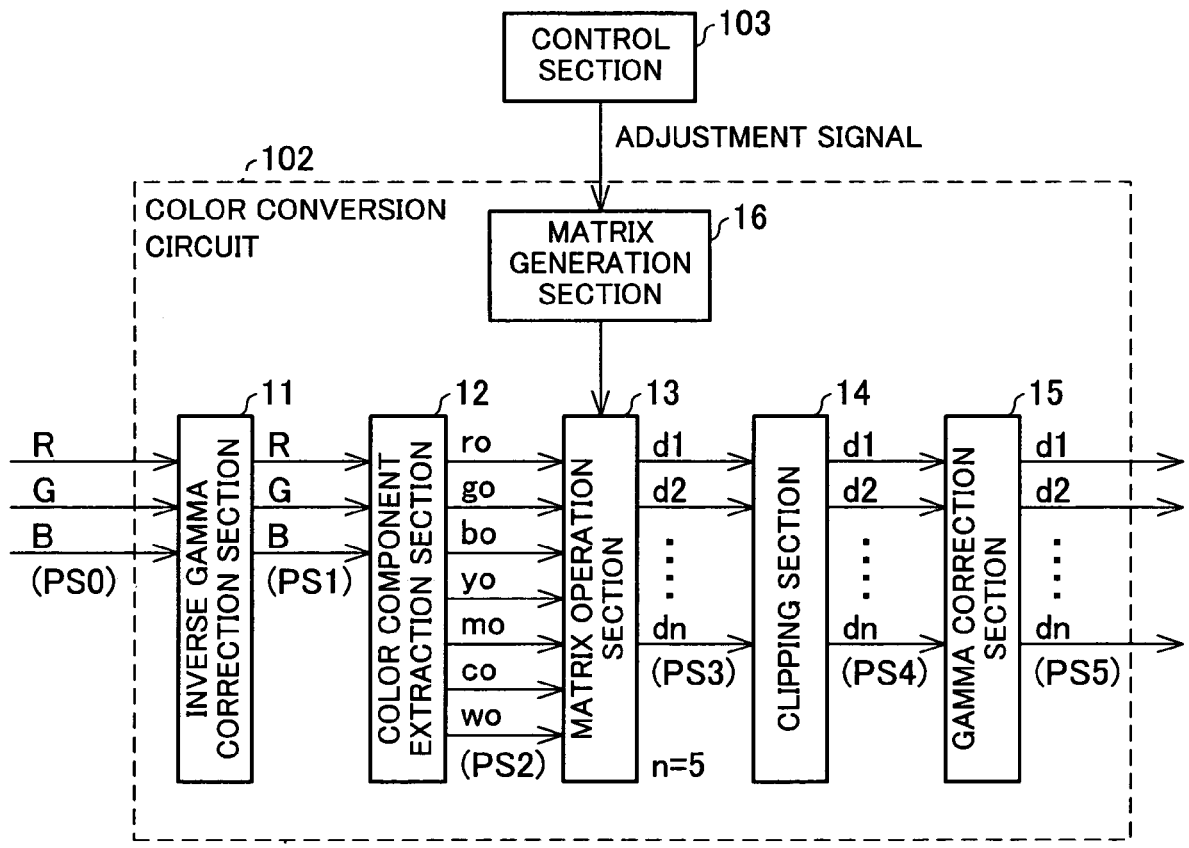
FIG. 2 is a block diagram showing a color conversion circuit of the color display apparatus of FIG. 1.

FIG. 2 illustrates a block diagram of the color conversion circuit 102. The color conversion circuit 102 includes an inverse gamma correction section 11, a color component extraction section 12, a matrix operation section 13, a clipping section 14, a gamma correction section 15, and a matrix generation section 16.

The inverse gamma correction section 11 performs inverse gamma correction on a video signal PS0 supplied to the color conversion circuit 102. The present embodiment assumes such a case that the video signal PS0 is supplied to the color conversion circuit 102, after being subjected to gamma correction. In the video signal having been subjected to the gamma correction, the relationship between the gray level and the brightness is nonlinear. On this account, the inverse gamma correction section 11 performs the inverse gamma correction, so as to cause the relationship between the gray level and the brightness to be linear.

In this manner, it is preferable that the inverse gamma correction be performed on the video signal PS0 supplied to the color conversion circuit 102, in a case where the video signal PS0 has been subjected to the gamma correction. However, in some cases, subsequent processes are successfully carried out even if the video signal having been subjected to the gamma correction is used without performing the inverse gamma correction thereon. If so, the inverse gamma correction section 11 can be omitted. The inverse gamma correction section 11 can also be omitted when the video signal PS0 supplied to the color conversion circuit 102 is not subjected to the gamma correction.

The color component extraction section 12 classifies a video signal PS1 into six patterns based on the magnitude relation of R, G, and B gray levels of the video signal PS1 after being subjected to the inverse gamma correction by the inverse gamma correction section 11, and then the color component extraction section 12 performs an operation corresponding to the pattern. As a result, the color component extraction section 12 generates a video signal PS2 representing color components of red (ro), green (go), blue (bo), yellow (yo), magenta (mo), cyan (co), and white (wo), by performing a calculation corresponding to each pattern.

The matrix operation section 13 performs a matrix operation corresponding to the number of basic colors of the 5-color display panel 101, so as to reorganize the color components of the video signal PS2 into the color components d1 through d5 corresponding to the basic colors of the 5-color display panel 101. As a result, the matrix operation section 13 generates a five-color video signal PS3.

The clipping section 14 generates a video signal PS4 by subjecting the video signal PS3 to clipping. This clipping is such a process that a gray level exceeding the upper allowable limit (1) or being lower than the lower allowable limit (0) is caused to fall within an allowable range.

The gamma correction section 15 performs, on the video signal PS4, gamma correction in accordance with the gamma characteristics of the 5-color display panel 101, so as to generate a video signal PS5. This video signal PS5 is supplied to the 5-color display panel 101.

Based on an adjustment signal supplied from the control section 103, the matrix generation section 16 generates a matrix used for the matrix operation performed by the matrix operation section 13, and the matrix generation section 16 supplies the generated matrix to the matrix operation section 13. This matrix generated by the matrix generation section 16 will be specifically described later.

(Processes)

Now, the following specifically describes the processes performed by the color component extraction section 12, the matrix operation section 13, and the matrix generation section 16.

When the video signal PS1 is supplied to the color component extraction section 12, the magnitude relation of gray levels r, g, and b of the respective color signals is evaluated. That is, it is determined to which one of the following six patterns the values of r, g, and b of the video signal fit:

$r>g>b$ [1]

$r>b>g$ [2]

$b>r>g$ [3]

$b>g>r$ [4]

$g>b>r$ [5]

$g>r>b$ [6]

Note that, the above-described patterns [1]-[6] do not include an equal sign. In reality, equal signs are suitably added in such a manner as to allow each of the combinations of r, g, and b to be included in only one of the patterns [1]-[6]. In the present case, equal signs are set as follows:

$r \geq g \geq b$ [1]

$r \geq b > g$ [2]

$$b > r \geq g \quad [3]$$

$$b > g > r \quad [4]$$

$$g \geq b > r \quad [5]$$

$$g > r \geq b \quad [6]$$

It is noted that equal signs may be differently set on condition that the relationship between the equal signs does not contradict each other.

The color component extraction section 12 extracts the gray levels ro, go, bo, yo, mo, co, and wo of red, green, blue, yellow, magenta, cyan, and white, in the following manner:

[1] Provided that $r \geq g \geq b$, $$ro = (r-g)$$

$$yo = (g-b)$$

$$go = bo = mo = co = 0$$

$$wo = b$$

[2] Provided that $r \geq b > g$, $$ro = (r-g)$$

$$mo = (b-g)$$

$$go = bo = yo = co = 0$$

$$wo = g$$

[3] Provided that $b > r \geq g$, $$bo = (b-r)$$

$$mo = (r-g)$$

$$ro = go = yo = co = 0$$

$$wo = g$$

[4] provided that $b > g > r$, $$bo = (b-g)$$

$$co = (g-r)$$

$$ro = go = yo = mo = 0$$

$$wo = r$$

[5] Provided that $g \geq b > r$, $$go = (g-b)$$

$$co = (b-r)$$

$$ro = bo = yo = mo = 0$$

$$wo = r$$

[6] Provided that $g > r \geq b$, $$go = (g-r)$$

$$yo = (r-b)$$

$$ro = bo = mo = co = 0$$

$$wo = b$$

In reference to FIG. 3, the meaning of the above-described calculations by the color component extraction section 12 will be discussed.

Figure 3:
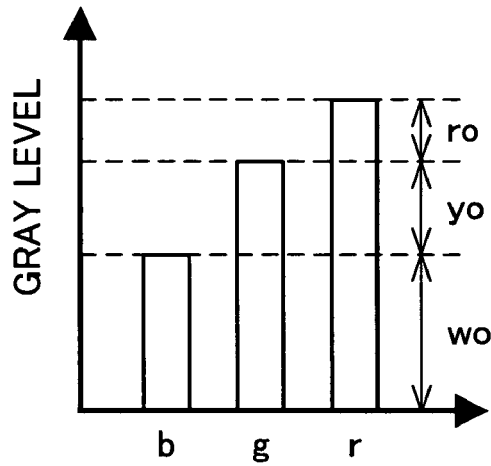
FIG. 3 is a graph for illustrating the relationship between gray scale levels of three primary colors and other color components.

FIG. 3 illustrates a case where the magnitude relation of the gray levels r, g, and b of the video signal PS1 fit into the pattern [1]. In the vertical direction of FIG. 3, these gray levels r, g, and b can be divided as shown in the figure.

First, all of the gray levels r, g, and b have white components. For this reason, in the case of FIG. 3, a gray level corresponding to the gray level b is wo. In a similar manner, in the case of FIG. 3, since the gray levels g and b have yellow components, a gray level corresponding to a difference between g and b is yo. Also, in the case of FIG. 3, a difference between r and g corresponds to a gray level ro.

In the case of $r > g > b$, since there are no color components corresponding to go, bo, mo, and co, the gray levels of these color components are 0.

As to the patterns [2]-[6], the conversion of color components can be carried out in a similar manner as that of the pattern [1]. As to each of the patterns [1]-[6], therefore, the color components ro, go, bo, yo, mo, co, and wo are worked out by the aforesaid calculations.

The matrix operation section 13 works out the following equation (1) using the color components ro, go, bo, yo, mo, co, and wo worked out by the color component extraction section 12, so as to generate the video signal PS3 made up of the color components d1 through d5.

[Equation (1)]

$$\begin{pmatrix} d1 \\ d2 \\ \vdots \\ d5 \end{pmatrix} = A_{5 \times 7} \begin{pmatrix} ro \\ go \\ bo \\ yo \\ mo \\ co \\ wo \end{pmatrix} \quad (1)$$

In the equation (1), $A_{5 \times 7}$ is a 5×7 matrix and represented by an equation (2) as follows:

[Equation (2)]

$$A_{5 \times 7} = \begin{pmatrix} a_{11} & a_{12} & a_{13} & a_{14} & a_{15} & a_{16} & a_{17} \\ a_{21} & a_{22} & a_{23} & a_{24} & a_{25} & a_{26} & a_{27} \\ a_{31} & a_{32} & a_{33} & a_{34} & a_{35} & a_{36} & a_{37} \\ a_{41} & a_{42} & a_{43} & a_{44} & a_{45} & a_{46} & a_{47} \\ a_{51} & a_{52} & a_{53} & a_{54} & a_{55} & a_{56} & a_{57} \end{pmatrix} \quad (2)$$

In the equation (2), elements (matrix coefficients) $a_{ij}$ in the matrix $A_{5 \times 7}$ are determined in line with the basic colors of the 5-color display panel 101, and are adjusted in line with the adjustment signal. These matrix coefficients are determined by the matrix generation section 16. The following will discuss how the matrix coefficients are determined.

Figure 4:
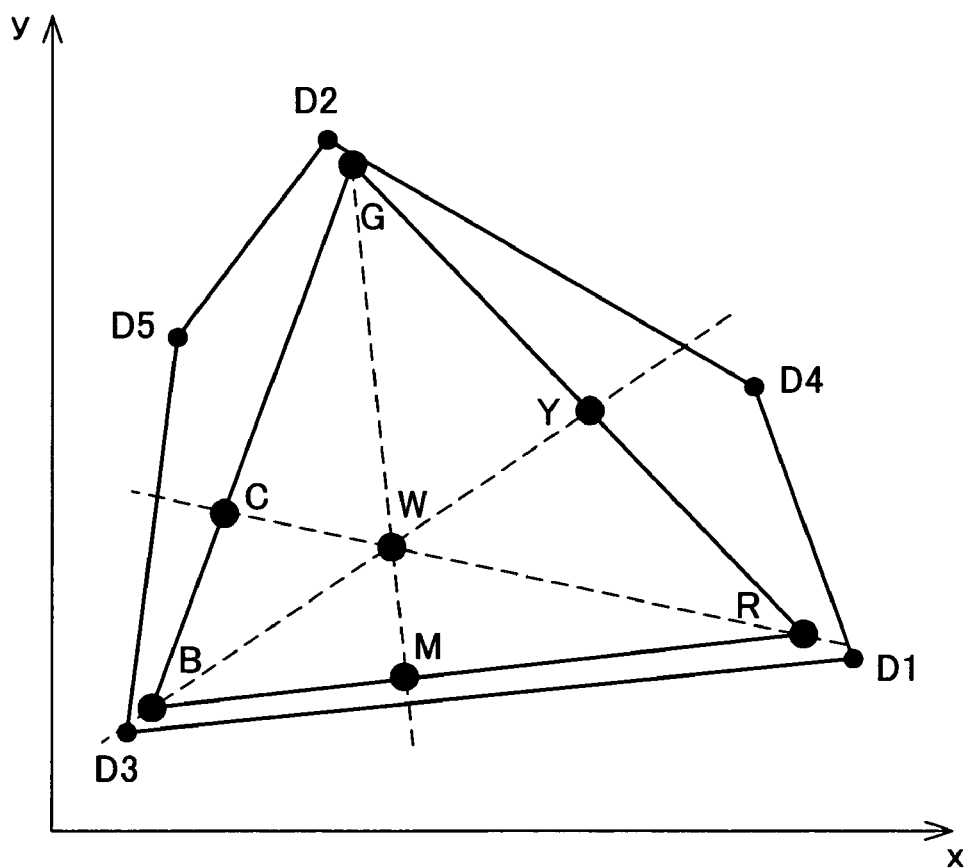
FIG. 4 is a chromaticity diagram regarding the color display apparatus of FIG. 1, showing the relationship between the color range expected in the input video signal and the color range that is displayable by a multicolor display panel.

FIG. 4 illustrates the basic colors of the 5-color display panel 101, as points d1 through d5 on a chromaticity diagram. These basic colors correspond to d1 through d5. FIG. 4 also represents primary colors expected in the video signal PS1, as points R, G, and B on the chromaticity diagram, and further illustrates points Y, M, C, and W on the chromaticity diagram, which correspond to yellow, magenta, cyan, and white worked out from the points R, G, and B. The points Y, M, C, and W on the chromaticity diagram meet (r=g, b=0), (r=b, g=0), (g=b, r=0), and (r=g=b), respectively.

It is noted that the present embodiment assumes that five basic colors of the 5-color display panel 101 are red (D1), green (D2), blue (D3), yellow (D4), and cyan (D5).

In general, a multicolor display panel is advantageous in that a wider color reproduction range is realized as compared to a three-primary-color display panel. On this account, the color reproduction range of the multicolor display panel is often designed so as to be wider than a color reproduction range estimated in a three-primary-color input signal (video signal PS0 or PS1). In this regard, as shown in FIG. 4, on a chromaticity diagram, the points of the three primary colors represented by the input signal are often positionally different from the points of the basic colors of the multicolor display panel. As a result, in some cases colors of an image displayed on the multicolor display panel are inappropriate or insufficient, if three primary colors represented by the input signal are simply converted to basic colors of the multicolor display panel.

To solve this problem, in the present embodiment a video signal is adjusted using an adjustment signal. More specifically, this adjustment is realized by adjusting matrix coefficients.

Figure 5:
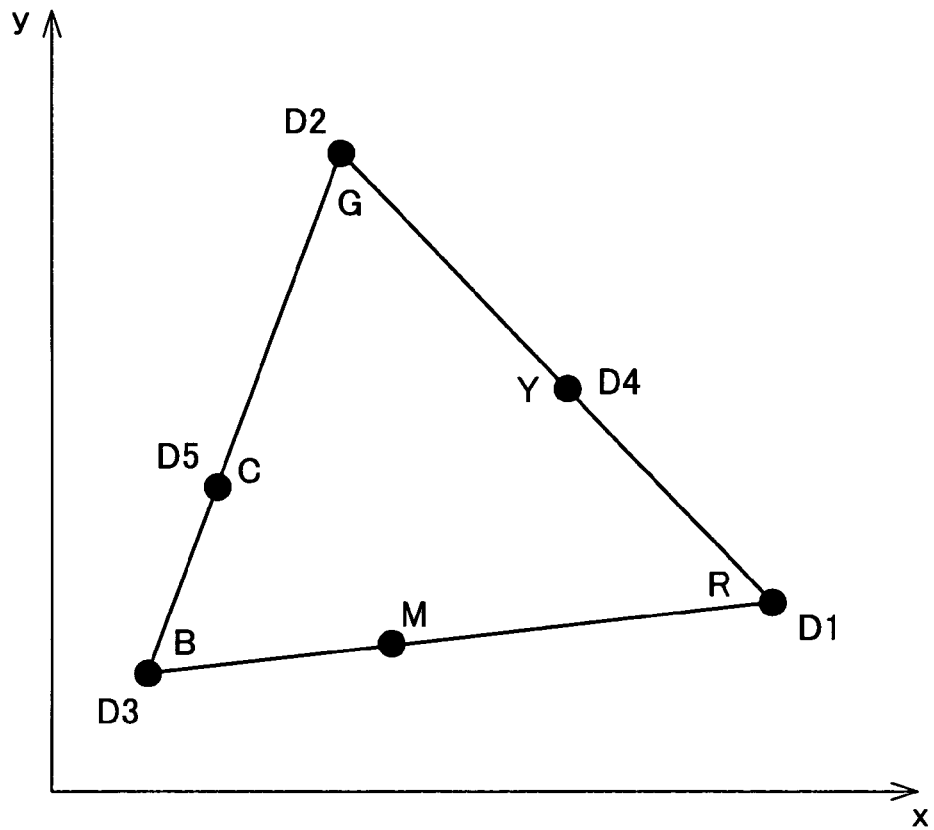
FIG. 5 is a chromaticity diagram regarding the color display apparatus of FIG. 1, showing the relationship between the color range expected in the input video signal and the color range displayable by a multicolor display panel, in a case where these color ranges are matched with each other.

For purposes of illustration, it is assumed that the relationship between the points of three primary colors of the input signal and the points of the basic colors of the multicolor display panel is as shown in FIG. 5, i.e., on a chromaticity diagram, the points R, G, B, Y, and C are in the same positions as the points D1, D2, D3, D4, and D5, and the corresponding points have an identical brightness.

In this case, the matrix coefficients are set as in an equation (3).

[Equation 3]

$$A_{5\times 7} = \begin{pmatrix} 1 & 0 & 0 & 0 & 1 & 0 & 1 \\ 0 & 1 & 0 & 0 & 0 & 0 & 1 \\ 0 & 0 & 1 & 0 & 1 & 0 & 1 \\ 0 & 0 & 0 & 1 & 0 & 0 & 1 \\ 0 & 0 & 0 & 0 & 0 & 1 & 1 \end{pmatrix} \quad (3)$$

The equation (1) is expanded using the equation (3), so that the following equations are obtained:

$d1 = ro + mo + wo$ $d2 = go + wo$ $d3 = bo + mo + wo$ $d4 = yo + wo$ $d5 = co + wo$

As the equations as a result of the expansion show, a 5-color video signal PS3 is obtained by (i) distributing, to d1 through d5, the corresponding color components, (ii) commonly adding the white component to all of d1 through d5, and (iii) evenly adding the color component mo to d1 and d3. The color component mo is evenly added to d1 and d3, because of the following reason: since the 5-color display panel 101 does not support a basic color point corresponding to magenta, the component mo is represented by D1 and D3. As a result of the above-described calculations, the video signal PS3 representing d1 through d5 is generated.

However, as shown in FIG. 4, the actual points D1 through D5 of the basic colors of the 5-color display panel 101 are not matched with the points R, G, B, Y, M, C, and W that are expected in the input signal. For this reason, the matrix coefficients of the equation (3) are preferably adjusted.

Figure 6:
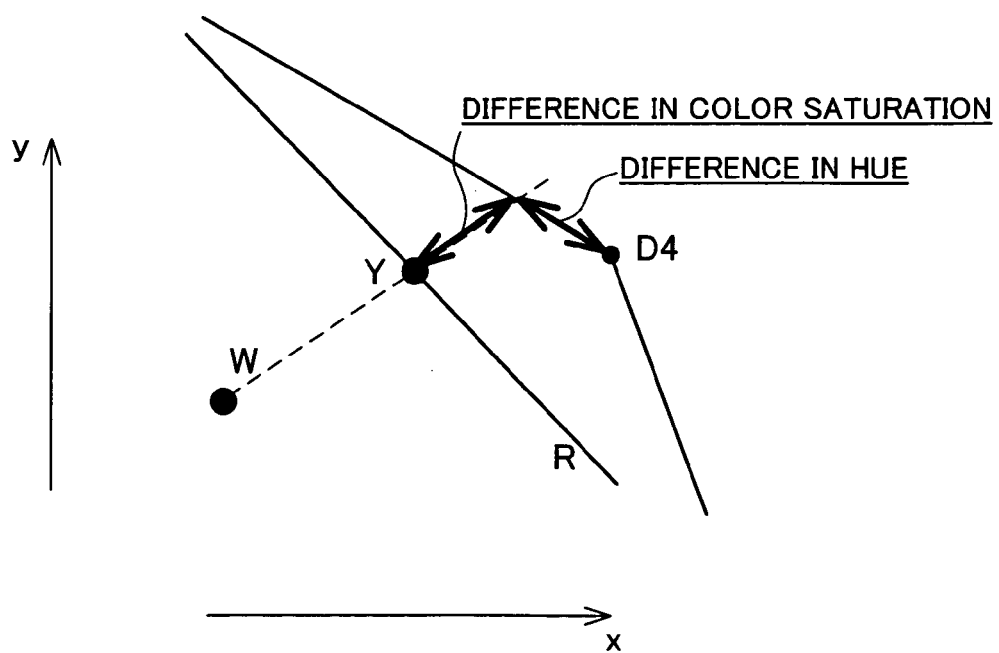
FIG. 6 is a chromaticity diagram regarding the color display apparatus of FIG. 1, for illustrating a method of adjusting the differences of hue and color saturation, between the color range expected in the input video signal and the color range that is displayable by a multicolor display panel.

For instance, it is assumed that the relationship between Y and D4 is as shown in FIG. 6. FIG. 6 is a close-up of a part around Y in FIG. 4. When, as FIG. 6 shows, D4 is on the R side with respect to a line connecting W and Y, the color reproduced at d4 (=yo+wo) is reddish yellow as compared to thee yellow color expected in the input signal.

To adjust this difference between the hues, d4 is allocated to yo, a value worked out by multiplying yo by a predetermined coefficient is added to the equation for calculating d2, and a value worked out by multiplying yo by a predetermined coefficient is subtracted from the equation for calculating d1. In other words, the yellow hue can be adjusted by changing the coefficients $a_{14}$ and $a_{24}$.

In the meanwhile, when, as shown in FIG. 6, D4 is on the outside of the line connecting W and Y, i.e. D4 is on the opposite side to W, the reproduced color has a color saturation (color purity) higher than that of the yellow color expected in the input signal.

To adjust this difference in color saturation, a value worked out by multiplying yo by a predetermined coefficient is added to each of the equations for calculating d1, d2, d3, and d5. In this case, the brightness levels of d1, d2, d3, and d5 increase. Therefore, to compensate the increase of the overall brightness level, the coefficient by which yo is multiplied may be decreased in the equation for calculating d4. That is to say, to adjust the color saturation of the yellow color, the coefficients $a_{14}$, $a_{24}$, $a_{34}$, and $a_{54}$ are adjusted, and the coefficient $a_{44}$ is further adjusted in order to compensate the change of the overall brightness as a result of the adjustment of the coefficients $a_{14}$, $a_{24}$, $a_{34}$, and $a_{54}$.

When the brightness of D4 is higher than the brightness of Y, the brightness of the reproduced yellow color is brighter than the brightness expected in the input signal.

To adjust this difference in brightness, a coefficient of y1 in the equation for calculating d4 is decreased. In other words, the brightness of the yellow color can be adjusted by adjusting the coefficient $a_{44}$.

Although the description above relates to the yellow color, the hue, color saturation, and brightness of other colors can be adjusted in a similar manner. Table. 1 illustrates a concrete example of the matrix coefficients for the adjustments of these parameters. It is noted that the adjusting parameters (the hue, color saturation, and brightness) are defined as shown in Table. 2.

TABLE 1

| | | |
|---|---|---|
| $a_{11} = Vr - Sr$ | $a_{12} = \frac{1}{2} \cdot Sg$ | $a_{13} = -Hb$ |
| $a_{21} = 0$ | $a_{22} = Vg - Sg$ | $a_{23} = 0$ |
| $a_{31} = +Hr$ | $a_{32} = \frac{1}{2} \cdot Sg$ | $a_{33} = Vb - Sb$ |
| $a_{41} = -Hr$ | $a_{42} = +Hg$ | $a_{43} = +Sb$ |
| $a_{51} = +SR$ | $a_{52} = -Hg$ | $a_{53} = +Hb$ |
| $a_{14} = Hy$ | $a_{15} = 1$ | $a_{16} = Sc$ |
| $a_{24} = -Hy$ | $a_{25} = 0$ | $a_{26} = +Hc$ |
| $a_{34} = Sy$ | $a_{35} = 1$ | $a_{36} = -Hc$ |
| $a_{44} = Vy - Sy$ | $a_{45} = 0$ | $a_{46} = 0$ |
| $a_{54} = 0$ | $a_{55} = 0$ | $a_{56} = Vc - Sc$ |
| $a_{17} = 1$ | | |
| $a_{27} = 1$ | | |
| $a_{37} = 1$ | | |
| $a_{47} = 1$ | | |
| $a_{57} = 1$ | | |

TABLE 2

| | HUE | COLOR SATULATION | BRIGHTNESS |
|---|---|---|---|
| RED | Hr | Sr | Vr |
| GREEN | Hg | Sg | Vg |
| BLUE | Hb | Sb | Vb |
| YELLOW | Hy | Sy | Vy |
| CYAN | Hc | Sc | Vc |

These adjusting parameters in Table. 2 are integers. When the adjusting parameter of the hue has a positive/negative value, the hue is adjusted clockwise/counterclockwise on the chromaticity diagram. When the adjusting parameter of the color saturation is a positive/negative value, the color saturation is adjusted so as to decrease/increase on the chromaticity diagram. Also, when the adjusting parameter of the brightness is not less than 1 or not more than 1, the brightness is adjusted so as to increase or decrease.

In the present case, the adjusting parameters are integers, in order to cause the gray levels d1 through d5 to be integers. The adjusting parameters, however, are not necessarily integers, when the video signal PS3 is not necessarily an integer or when, after calculating d1=d5, the results of the calculations of d1 and d5 are rounded to integers.

The above-described method of adjusting the matrix coefficients is only an example. The adjustment may be performed in a different manner.

For instance, apart from the aforesaid method in which Sr is added to $a_{51}$ while Sr is subtracted from $a_{11}$, the adjustment of color saturation of red color may be performed in such a manner that Sr is added to $a_{21}$ and $a_{23}$ and then Sr is subtracted from $a_{11}$.

In the above-described example, moreover, the operation of adding Sr to $a_{51}$ and subtracting Sr from $a_{11}$ is performed for keeping average brightness. This operation presumes that D1 and D5 in FIG. 4 have an identical brightness. If D1 and D5 have different brightness, each Sr is preferably multiplied by a correction coefficient that takes the difference of brightness into account.

Moreover, in the chromaticity diagram, a primary color expected in the input signal is not necessarily matched with a basic color of the 5-color display panel 101, as long as the color is adjusted so as not to look inappropriate. In some cases, the color saturation and brightness are enhanced for the sake of a better display quality, even if the color saturation and brightness are not matched with original values. Also in this case, the matrix coefficients are adjusted in such a manner as to obtain a desirable display quality.

When the matrix coefficients have certain values, d1 through d5 generated by the matrix operation section 13 may be more than 1 or less than 0. In such a case, the clipping is carried out by the clipping section 14, so that d1 through d5 are caused to fall within the range of $0 \leq d1, d2, d3, d4, d5 \leq 1$.

Also, since the 5-color display panel 101 has gamma characteristics, the gamma correction section 15 performs the gamma correction on the video signal PS4 after being subjected to the clipping.

As described above, the color conversion circuit 102 is a color signal converter that converts a three-primary-color signal to a 5-color signal. Since the present embodiment assumes that the multicolor display panel 101 has a 5-color pixel, the color conversion circuit 102 performs the conversion to 5-color signals. In the present invention, however, the multicolor display panel 101 may be a display panel having n-color pixels corresponding to n colors ($n \geq 4$). In such a case, the color conversion circuit 102 performs the conversion to an n-color signal representing that number of the colors.

The color conversion circuit 102 includes the color component extraction section 12 serving as a first color signal generation module that generates, by subjecting the three-primary-color signal to isochromatic conversion, an m-color signal made up of m color components ($m \geq n$) including colors equivalent to those of the color components of the n-color signal. It is noted that the color components having equivalent colors are two color components whose positions on the chromaticity diagram are relatively close to each other and which are sensed as similar colors, such as R and D1, G and D2, B and D3, Y and D4, and C and D5 in FIG. 4.

The color conversion circuit 102 also includes the matrix operation section 13 serving as a second color signal generation module that generates the color components of the n-color signal by performing linear combination of the color components of the m-color signal. The linear combination of the color components indicates that, as shown in the equation (1), the sum total of color components each multiplied by a coefficient.

The generation of the color components of the n-color signal, which is performed by the linear combination of the color components of the m-color signal, is carried out in the following manner.

Since the color components of the m-color signal include color components whose colors are equivalent to the colors of the color components of the n-color signal, these color components having the equivalent colors can be allocated as the corresponding color components of the n-color signal. If the color components of the m-color signal includes those not corresponding to the color components of the n-color signal (i.e. some color components are redundant), these redundant color components are suitably allocated to the color components of the n-color signal. This allocation is realized by changing the matrix coefficients in the equation (1) to those in the equation (3).

Furthermore, the aforesaid allocation is adjusted using, as parameters, the hue, color saturation, and brightness regarding the color components of the n-color signal. With this, the colors represented by the n-color signal can be adjusted in accordance with these parameters. This adjustment is realized by setting the matrix coefficients in the equation (1) in line with Table. 1.

In this manner, in the color conversion circuit 102, the adjustment of the colors represented by the n-color signal can be performed using, as the parameters, the hue, color saturation, and brightness regarding the color components of the n-color signal. The hue, color saturation, and brightness regarding the color components of the n-color signal are intuitively understandable. On this account, the color conversion circuit 102 is capable of adjusting the colors represented by the converted signal, using intuitively-understandable parameters.

Incidentally, the color component extraction section 12 sets the followings as the m color components: primary-color components of the three-primary-color signal; complementary color components corresponding to the respective primary-color components; and an achromatic-color component. With this, as the above-described patterns [1]-[6] show, the m-color signal is generated by performing simple calculations such as subtracting one primary-color component from another primary-color component.

The color conversion circuit 102 is further provided with the matrix generation section 16 serving as a coefficient change module for changing the matrix coefficients used in the matrix operation section 13. The color conversion circuit 102, however, is not necessarily provided with the matrix generation section 16. In such a case, the aforesaid adjustment may be performed at the time of manufacture of the color conversion circuit 102, by an adjusting device equivalent to the matrix generation section 16 and the control section 103. Even so, incorporating the matrix generation section 16 into the color conversion circuit 102 and providing the control section 103 are advantageous in that the adjustment can be performed at any time, even after the shipment of the color display apparatus 100.

The characteristic feature of the color conversion circuit 102 can be rephrased as follows: the color conversion circuit 102 is a signal converter that converts a three-dimensional video signal to an n-dimensional video signal supplied to the multicolor display panel 101 including n-color (n≧4) pixels. The color conversion circuit 102 (i) identifies which one of six patterns categorized in accordance with the magnitude relation of gray levels of the three-dimensional video signal is matched with the pattern of the actually-inputted three-dimensional video signal, (ii) extracts a plurality of color components by performing an operation corresponding to each pattern, and (iii) reorganizes the extracted color components into the input signal to the multicolor display panel 101. Furthermore, the color conversion circuit 102 generates a multi-dimensional video signal, using (I) a first module that extracts red (ro), green (go), blue (bo), yellow (yo), cyan (co), magenta (mo), and white (wo) components, by identifying 6 patterns from the gray levels of the three-dimensional video signal and performing an operation corresponding to each pattern and (II) a second module that reorganizes these components, by means of the aforesaid matrix operation in line with n.

With this color conversion circuit 102, a multi-dimensional video signal corresponding to a multicolor display apparatus is generated by performing an operation based on a typically-used three-dimensional video signal.

It is noted that the matrix coefficients in the equation (2) may be changed in accordance with the result of the identification of the patterns by the color component extraction section 12.

Also, the components ro, go, bo, yo, mo, co, and wo may be subjected to the matrix operation by the matrix operation section 13, after being subjected to nonlinear processing.

[Embodiment 2]

Figure 7:
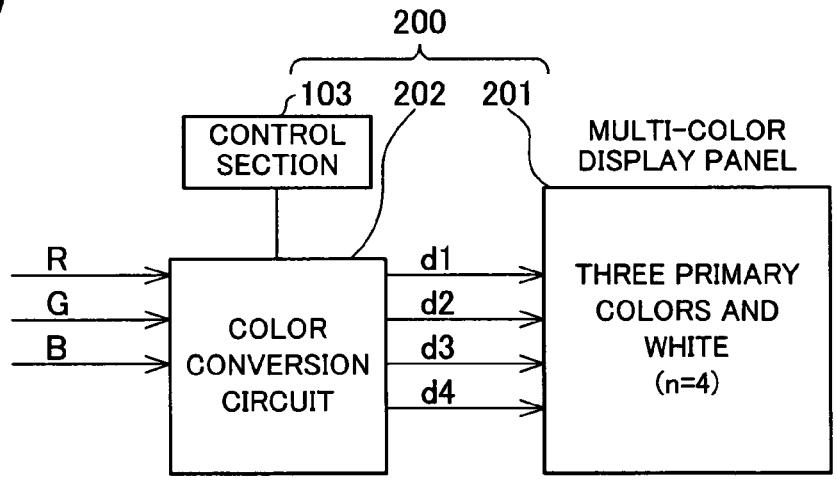
FIG. 7 is a block diagram showing a color display apparatus of Embodiment 2 of the present invention.
Figure 8:
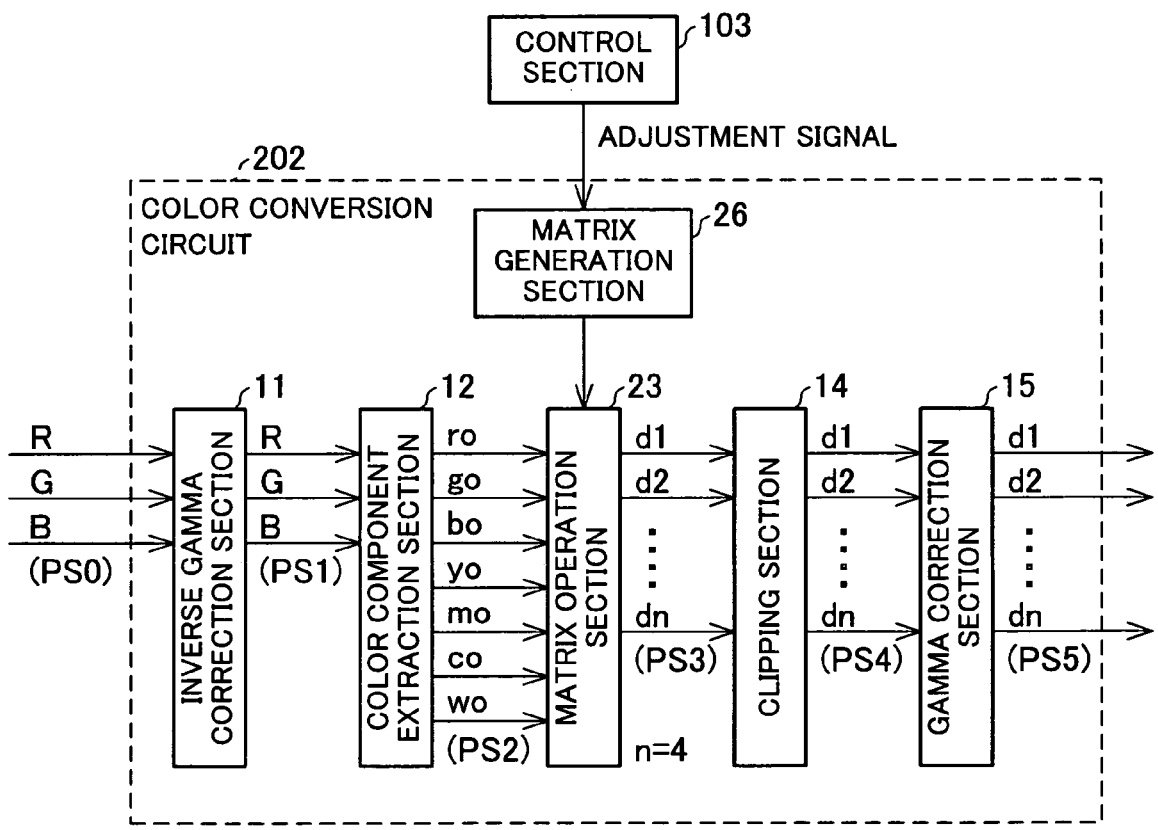
FIG. 8 is a block diagram showing a color conversion circuit of the color display apparatus of FIG. 7.
Figure 9:
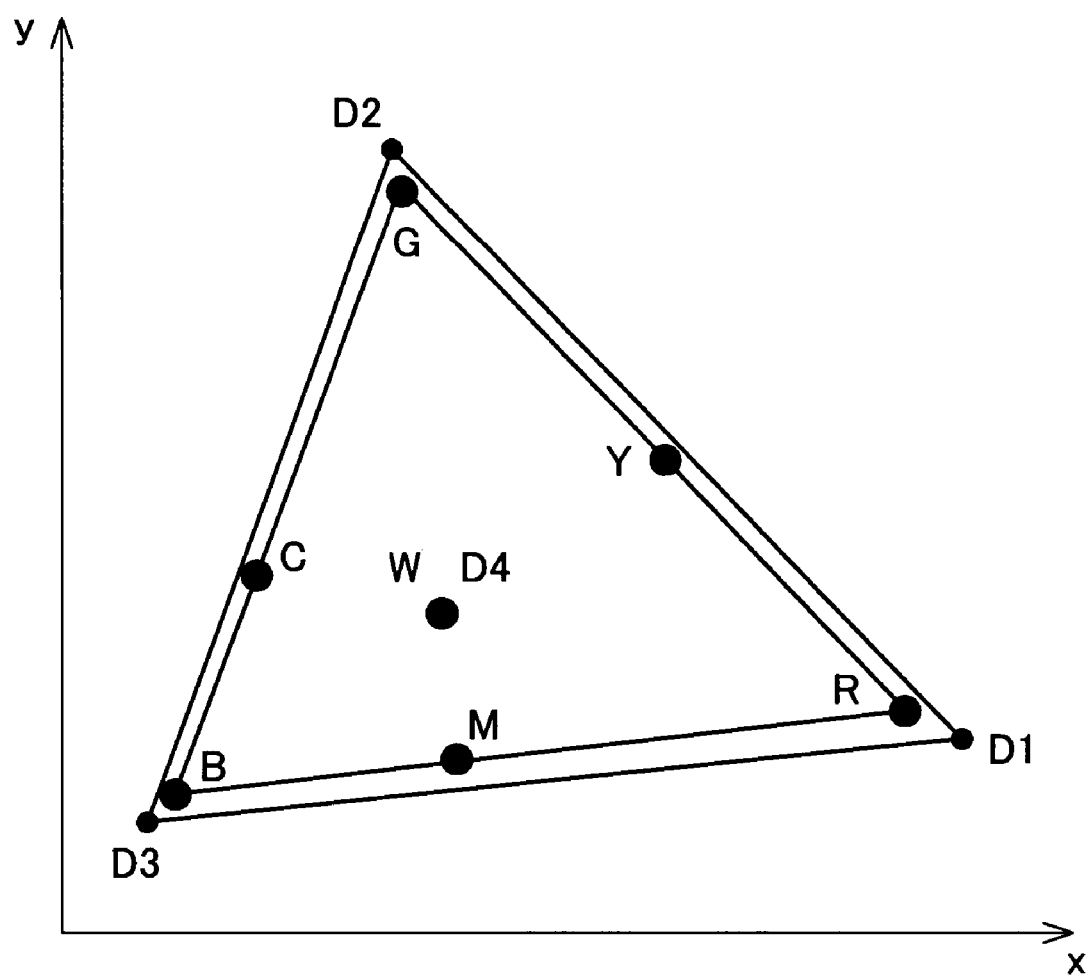
FIG. 9 is a chromaticity diagram regarding the color display apparatus of FIG. 7, showing the relationship between the color range expected in the input video signal and the color range that is displayable by a multicolor display panel.

The following will describe Embodiment 2 of the present invention, in reference to FIGS. 7-9.

As shown in FIG. 7, a color display apparatus 200 of the present embodiment includes a multicolor display panel 201, a color conversion circuit 202, and a control section 103.

The multicolor display panel 201 of the present embodiment is different from the 5-color display panel 101 of Embodiment 1. The multicolor display panel 201 supports four basic colors (R, G, and B primary colors and white). In this regard, in the present embodiment, the multicolor display panel 201 may be at times termed 4-color display panel 201.

As shown in FIG. 8, the color conversion circuit 202 of the present embodiment is different from the color conversion circuit 102 of Embodiment 1. The color conversion circuit 202 is a processing circuit corresponding to the multicolor display panel 201 and has a block configuration similar to that of the color conversion circuit 102 of Embodiment 1 (shown in FIG. 2). The color conversion circuit 202 is different from the color conversion circuit 102 in that the color conversion circuit 202 is provided with a matrix operation section 23 and a matrix generation section 26 that perform operations different from those by he matrix operation section 13 and the matrix generation section 16. These circuits are also different in that, in the color conversion circuit 202, each of the video signals PS3-PS5 are made up of d1 through d4.

Apart from the above, the control section 103 and the color conversion circuit 202 have the same functions as those described in Embodiment 1, so that the same numbers are given and the descriptions are omitted for the sake of convenience.

In FIG. 9, (i) basic colors of the 4-color display panel 201, which respectively correspond to d1 through d4, are represented as points D1 through D4 on a chromaticity diagram, (ii) primary colors expected in a video signal PS1 are represented as points R, G, and B on the chromaticity diagram, and (iii) yellow, magenta, cyan, and white, which are worked out from the points R, G, and B, are represented as points Y, M, C, and W on the chromaticity diagram. As shown in FIG. 9, the point D4, which corresponds to white that is one of the basic colors of the multicolor display panel 201, locates inside a chromaticity area formed by the points D1 through D3.

A matrix operation section 23 of the color conversion circuit 202 works out an equation (4) using the components ro, go, bo, yo, mo, co, and wo calculated by the color component extraction section 12 in a manner similar to those of Embodiment 1. As a result, the matrix operation section 23 generates a video signal PS3 made up of d1 through d4.

[Equation 4]

$$\begin{pmatrix} d1 \\ d2 \\ d3 \\ d4 \end{pmatrix} = A_{4 \times 7} \begin{pmatrix} ro \\ go \\ bo \\ yo \\ mo \\ co \\ wo \end{pmatrix} \quad (4)$$

In the equation 4, $A_{4 \times 7}$ is a 4×7 matrix and represented by an equation (5) as follows:

[Equation 5]

$$A_{4 \times 7} = \begin{pmatrix} a_{11} & a_{12} & a_{13} & a_{14} & a_{15} & a_{16} & a_{17} \\ a_{21} & a_{22} & a_{23} & a_{24} & a_{25} & a_{26} & a_{27} \\ a_{31} & a_{32} & a_{33} & a_{34} & a_{35} & a_{36} & a_{37} \\ a_{41} & a_{42} & a_{43} & a_{44} & a_{45} & a_{46} & a_{47} \end{pmatrix} \quad (5)$$

Elements (matrix coefficients) $a_{ij}$ of the matrix $A_{4 \times 7}$ are determined in accordance with the basic colors of the 4-color display panel 201, and are adjusted in accordance with an adjustment signal. The matrix coefficients are set by the matrix generation section 26, in accordance with Table. 3 in a similar manner as in Embodiment 1. It is noted that the adjusting parameters (hue, color saturation, and brightness) are defined as shown in Table 4. In this case, it is assumed that white color corresponding to d4 is not necessarily adjusted.

TABLE 3

| | | |
|---|---|---|
| $a_{11}$ = Vr − Sr | $a_{12}$ = +Hg | $a_{13}$ = −Hb |
| $a_{21}$ = −Hr | $a_{22}$ = Vg − Sg | $a_{23}$ = +Hb |
| $a_{31}$ = +Hr | $a_{32}$ = −Hg | $a_{33}$ = Vb − Sb |
| $a_{41}$ = 0 | $a_{42}$ = 0 | $a_{43}$ = 0 |
| $a_{14}$ = 1 | $a_{15}$ = 1 | $a_{16}$ = 0 |
| $a_{24}$ = 1 | $a_{25}$ = 0 | $a_{26}$ = 1 |
| $a_{34}$ = 0 | $a_{35}$ = 1 | $a_{36}$ = 1 |

TABLE 3-continued

| | | |
|---|---|---|
| $a_{44} = 0$ | $a_{45} = 0$ | $a_{46} = 0$ |
| $a_{17} = 1$ | | |
| $a_{27} = 1$ | | |
| $a_{37} = 1$ | | |
| $a_{47} = 1$ | | |

TABLE 4

| | HUE | COLOR SATURATION | BRIGHTNESS |
|---|---|---|---|
| RED | Hr | Sr | Vr |
| GREEN | Hg | Sg | Vg |
| BLUE | Hb | Sb | Vb |

As a matter of course, the aforesaid case is merely an example as described in Embodiment 1.

By the way, the adjustment of the white color is realized by adjusting the seventh column of the matrix coefficients. For instance, when white color is yellowish as compared to the white color expected in the input signal, a coefficient $a_{37}$ is set so as to be larger than 1, or coefficients $a_{17}$ and $a_{27}$ are set so as to be smaller than 1. Alternatively, in consideration of average brightness, the coefficient $a_{37}$ is set so as to be larger than 1, while the coefficients $a_{17}$ and $a_{27}$ are set so as to be smaller than 1.

In this manner, the color conversion circuit 202 can generate a video signal corresponding to the multicolor display panel 201 including "white" pixels. The color conversion circuit 202 can adjust the hue, color saturation, and brightness of d1 through d3.

As described above, the color conversion circuit 202 is a color signal converter that converts a three-primary-color signal to a 4-color signal representing colors including white. In the present embodiment, the color conversion circuit 202 performs conversion to the four-color signal because a display panel including four-color pixels is adopted as the multicolor display panel 101. Alternatively, a display panel including n-color ($n \geq 4$) pixels may be adopted as the multicolor display panel 201. In this case, the color conversion circuit 202 performs conversion to a n-color signal corresponding to the number of the colors of the pixels.

The color conversion circuit 202 includes the color component extraction section 12 serving as a first color signal generation module that generates, by subjecting the three-primary-color signal to isochromatic conversion, an m-color signal made up of m color components ($m \geq n$) including colors equivalent to those of the color components of the n-color signal. It is noted that the color components having equivalent colors are two color components whose positions on a chromaticity diagram are relatively close to each other and which are sensed as similar colors, such as R and D1, G and D2, B and D3, and W and D4 in FIG. 9. Color components having equivalent colors include two identical color components, such as W and D4, whose positions on the chromaticity diagram are identical with each other.

With this, in a manner similar to Embodiment 1, the color conversion circuit 202 makes it possible to adjust the colors represented by a signal after the conversion, by means of intuitively-understandable parameters.

As in Embodiment 1, the color conversion circuit 202 further includes a matrix generation section 26 serving as a coefficient change module that changes the matrix coefficients in the matrix operation section 23.

The characteristic feature of the color conversion circuit 202 can be rephrased as follows: the color conversion circuit 202 is a signal converter that converts a three-dimensional video signal to an n-dimensional video signal supplied to the multicolor display panel 201 including n-color ($n \geq 4$) pixels. The color conversion circuit 202 (i) identifies which one of six patterns categorized in accordance with the magnitude relation of gray levels of the three-dimensional video signal is matched with the pattern of the actually-inputted three-dimensional video signal, (ii) extracts a plurality of color components by performing an operation corresponding to each pattern, and (iii) reorganizes the extracted color components into the input signal to the multicolor display panel 201. Furthermore, the color conversion circuit 202 generates a multi-dimensional video signal, using (I) a first module that extracts red (ro), green (go), blue (bo), yellow (yo), cyan (co), magenta (mo), and white (wo) components, by identifying 6 patterns from the gray levels of the three-dimensional video signal and performing an operation corresponding to each pattern and (II) a second module that reorganizes these components, by means of the aforesaid matrix operation in line with n.

With this color conversion circuit 202, a multi-dimensional video signal corresponding to a multicolor display apparatus is generated by performing an operation based on a typically-used three-dimensional video signal.

It is noted that the matrix coefficients in the equation (5) may be changed in accordance with the result of the identification of the patterns by the color component extraction section 12.

Also, the components ro, go, bo, yo, mo, co, and wo worked out by the color component extraction section 12 may be subjected to the matrix operation by the matrix operation section 23, after being subjected to nonlinear processing.

[Embodiment 3]

The following will describe Embodiment 3 of the present invention in reference to FIGS. 10-13.

Figure 10:
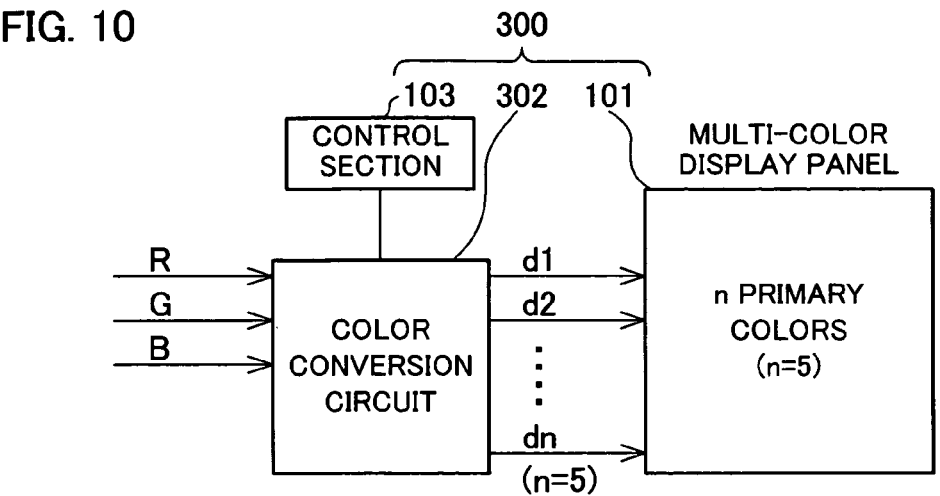
FIG. 10 is a block diagram showing a color display apparatus of Embodiment 3 of the present invention.

As shown in FIG. 10, a color display apparatus 300 of the present embodiment includes a multicolor display panel 101, a color conversion circuit 302, and a control section 103.

The color conversion circuit 302 of the present embodiment is different from the color conversion circuit 102 of Embodiment 1. The control section 103 and the 5-color display panel 101 are more or less identical with those in Embodiment 1, so that these members are given the same numbers and the descriptions thereof are omitted for the sake of convenience.

Figure 11:
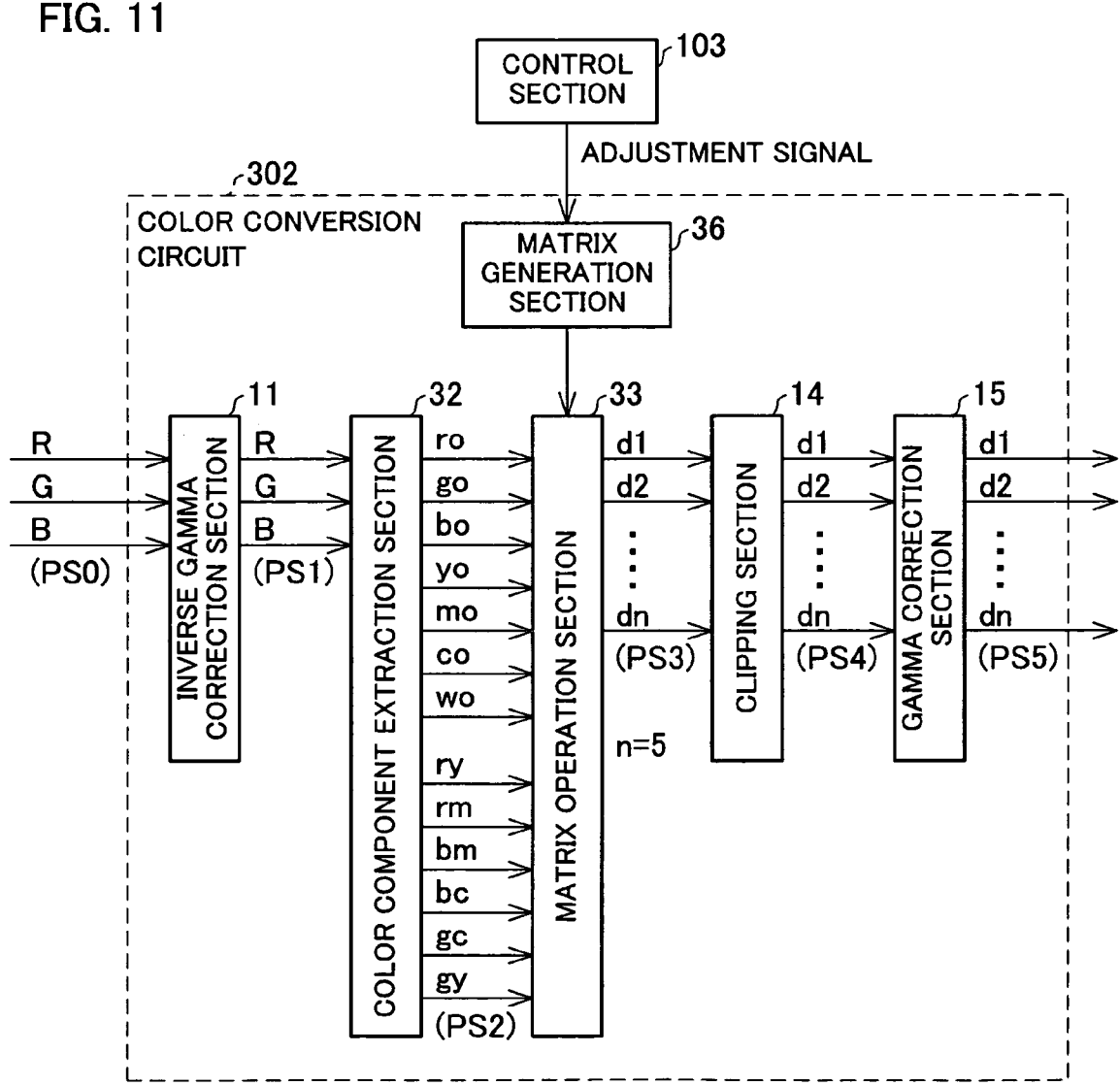
FIG. 11 is a block diagram of a color conversion circuit of the color display apparatus of FIG. 10.

As shown in FIG. 11, the color conversion circuit 302 is different from the color conversion circuit 102 in that, primarily, the color conversion circuit 302 is provided with a color component extraction section 32, a matrix operation section 33, and a matrix generation section 36, which perform processes different from those performed by the color component extraction section 12, the matrix operation section 13, and the matrix generation section 16. The difference between these circuits is also in that, in addition to signals representing respective color components of red (ro), green (go), blue (bo), yellow (yo), magenta (mo, cyan (Co), and white (wo) a video signal PS2 in the color conversion circuit 302 includes signals representing neutral colors (described later).

Apart from the above, the arrangement of the color conversion circuit 302 are more or less identical with those in Embodiment 1 so that such arrangements are given the same numbers and the descriptions thereof are omitted for the sake of convenience.

The color component extraction section 32 generates a video signal PS2 representing 13 types of color components (in addition to red (ro), green (go), blue (bo), yellow (yo), magenta (mo), cyan (co), and white (wo), there are red-yellow (ry), red-magenta (rm), blue-magenta (bm), blue-cyan (bc), green-cyan (gc), and green-yellow (gy) that are neutral colors between the colors ro through co), by the following operation: (i) a video signal PS1 after being subjected to inverse gamma correction by the inverse gamma correction section 11 is classified into six patterns, in accordance with the magnitude relation of R, G, and B gray levels of the video signal PS1, (ii) these patterns are further classified into two sub-patterns, and (iii) an operation corresponding to each pattern and sub-pattern is performed.

More specifically, when the video signal PS1 is supplied to the color component extraction section 12, it is determined which one of the following six patterns the values r, g, and b of the video signal fit into. The video signal is supplied in a manner similar to Embodiment 1.

$$r \geq g \geq b \quad [1]$$

$$r \geq b > g \quad [2]$$

$$b > r \geq g \quad [3]$$

$$b > g > r \quad [4]$$

$$g \geq b > r \quad [5]$$

$$g > r \geq b \quad [6]$$

Then the gray levels the aforesaid 13 types of color components ro, go, bo, yo, mo, co, wo, ry, rm, bm, bc, gc, and gy are worked out in the following manners:

[1] In a case where $r \geq g \geq b$, $$ro = (r-g)$$

$$yo = (g-b)$$

$$wo = b$$

$$go = bo = mo = co = 0$$

<1> if ro≥yo, ry=yo
<2> if ro<yo, ry=ro $$gy = gc = bc = bm = rm = 0$$

[2] In a case where $r \geq b > g$, $$ro = (r-b)$$

$$mo = (b-g)$$

$$wo = g$$

$$go = bo = yo = co = 0$$

<3> if ro≥mo, rm=mo
<4> if ro<yo, rm=ro $$ry = gy = gc = bc = bm = 0$$

[3] In a case where $b > r \geq g$, $$bo = (b-r)$$

$$mo = (r-g)$$

$$wo = g$$

$$ro = go = yo = co = 0$$

<5> if bo≥mo, bm=mo
<6> of bo<mo, bm=bo $$ry = gy = gc = bc = rm = 0$$

[4] In a case where b>g>r, $$bo = (b-g)$$

$$co = (g-r)$$

$$wo = r$$

$$ro = go = yo = mo = 0$$

<7> if bo≥co, bc=co
<8> if bo<co, bc=bo $$ry = gy = gc = bm = rm = 0$$

[5] In a case where $g \geq b > r$, $$go = (g-b)$$

$$co = (b-r)$$

$$wo = r$$

$$ro = bo = yo = mo = 0$$

<9> if go≥co, gc=co
<10> if go<co, gc=co $$ry = gy = bc = bm = rm = 0$$

[6] In a case where $g > r \geq b$, $$go = (g-r)$$

$$yo = (r-b)$$

$$wo = b$$

$$ro = bo = mo = co = 0$$

<11> if go≥yo, gy=yo
<12> if go<yo, gy=go $$ry = gc = bc = bm = rm = 0$$

Figure 12:
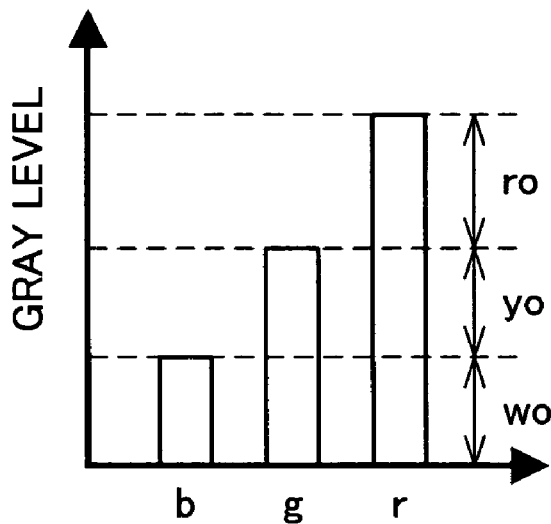
FIG. 12 is a graph for illustrating the relationship between gray levels of three primary colors and other color components.
Figure 13:
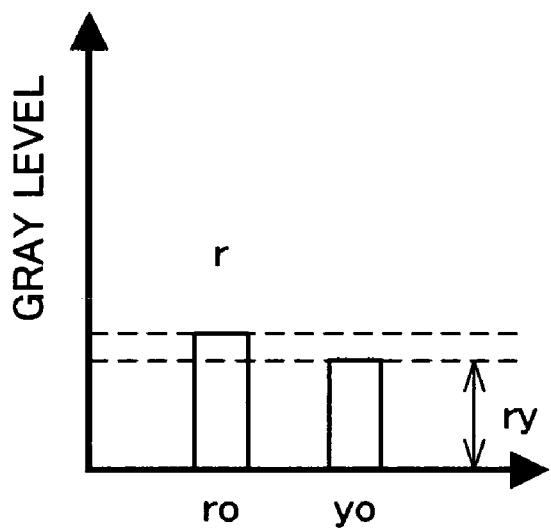
FIG. 13 is a graph for illustrating the relationship between said other color components and a further color component.

Referring to FIGS. 12 and 13, the meaning of these calculations performed in the color component extraction section 32 will be described.

In the above-described calculations, the magnitude relation of the extracted ro, go, bo, yo, mo, co, and wo components is worked out, so that the classification of sub-patterns <1>-<12> is realized.

FIG. 12 shows a case where the gray levels r, g, and b have a magnitude relation of the pattern [1] (r>g>b). Meanwhile, FIG. 13 shows a case where ro and yo worked out in the aforesaid pattern [1] correspond to ro>yo included in the sub-pattern <1>.

As FIG. 13 illustrates, when ro>yo, it is possible to assume that the gray level yo is a common level between ro and yo. On this account, the gray level of yo would correspond to red-yellow (ry) that is a neutral color (orange) between red and yellow. In similar manners, ry, rm, bm, bc, gc, gy are worked out in the color component extraction section 32.

The matrix operation section 33 generates a video signal PS3 made up of color components d1 through d5, in the following manner: an equation (6) is worked out using ro, go, bo, yo, mo, co, wo, ry, rm, bm, bc, gc, and gy figured out in the color component extraction section 32, a matrix operation corresponding to the number of basic colors of the 5-color display panel 101 is performed, so that the color components of the video signal PS2 are reorganized into the color components d1 through d5 corresponding to the basic colors of the 5-color display panel 101.

[Equation 6]

$$\begin{pmatrix} d1 \\ d2 \\ \vdots \\ d5 \end{pmatrix} = A_{5\times 13} \begin{pmatrix} ro \\ go \\ bo \\ yo \\ mo \\ co \\ wo \\ ry \\ rm \\ bm \\ bc \\ gc \\ gy \end{pmatrix} \quad (6)$$

In the equation 6, $A_{5\times 13}$ is a 5×13 matrix, and represented by an equation (7).

[Equation 7]

$$A_{5\times 13} = \begin{pmatrix} a_{11} & a_{12} & a_{13} & \cdots & a_{111} & a_{112} & a_{113} \\ a_{21} & a_{22} & a_{23} & \cdots & a_{211} & a_{212} & a_{213} \\ a_{31} & a_{32} & a_{33} & \cdots & a_{311} & a_{312} & a_{313} \\ a_{41} & a_{42} & a_{43} & \cdots & a_{411} & a_{412} & a_{413} \\ a_{51} & a_{52} & a_{53} & \cdots & a_{511} & a_{512} & a_{513} \end{pmatrix} \quad (7)$$

The elements (matrix coefficients) $a_{ij}$ in the matrix $A_{5\times 13}$ are determined in line with the basic colors of the 5-color display panel 101, and are adjusted in line with the adjustment signal. These matrix coefficients are determined by the matrix generation section 36. The matrix coefficients can be determined as shown in Table. 5, in a manner similar to Embodiment 1. The adjusting parameters (hue, color saturation and brightness) are defined as shown in Table. 6.

TABLE 5

| | ro | go | bo | yo | mo | co | wo |
|---|---|---|---|---|---|---|---|
| d1(R) | $a_{11} = Vr - Sr$ | $a_{12} = Sg/2$ | $a_{13} = -Hb$ | $a_{14} = +Hy$ | $a_{15} = Vm - Sm/2 - Hm$ | $a_{16} = Sc$ | $a_{17} = 1$ |
| d2(G) | $a_{21} = 0$ | $a_{22} = Vg + Sg$ | $a_{23} = -0$ | $a_{24} = -Hy$ | $a_{25} = Sm$ | $a_{26} = +Hc$ | $a_{27} = 1$ |
| d3(B) | $a_{31} = +Hr$ | $a_{32} = Sg/2$ | $a_{33} = Vb + Sb$ | $a_{34} = Sy$ | $a_{35} = Vm - Sm/2 + Hm$ | $a_{36} = -Hc$ | $a_{37} = 1$ |
| d4(Y) | $a_{41} = -Hr$ | $a_{42} = +Hg$ | $a_{43} = Sb$ | $a_{44} = Vy - Sy$ | $a_{45} = 0$ | $a_{46} = 0$ | $a_{47} = 1$ |
| d5(C) | $a_{51} = +Sr$ | $a_{52} = -Hg$ | $a_{53} = +Hb$ | $a_{54} = 0$ | $a_{55} = 0$ | $a_{56} = Vc - Sc$ | $a_{57} = 1$ |
| d1(R) | $a_{10} = 0$ | $a_{19} = 0$ | $a_{110} = 0$ | $a_{111} = 0$ | $a_{112} = 0$ | $a_{113} = 0$ | |
| d2(G) | $a_{28} = 0$ | $a_{20} = 0$ | $a_{210} = 0$ | $a_{211} = 0$ | $a_{212} = 0$ | $a_{213} = 0$ | |
| d3(B) | $a_{38} = 0$ | $a_{39} = 0$ | $a_{310} = 0$ | $a_{311} = 0$ | $a_{312} = 0$ | $a_{313} = 0$ | |
| d4(Y) | $a_{48} = 0$ | $a_{49} = 0$ | $a_{410} = 0$ | $a_{411} = 0$ | $a_{412} = 0$ | $a_{413} = 0$ | |
| d5(C) | $a_{58} = 0$ | $a_{59} = 0$ | $a_{510} = 0$ | $a_{511} = 0$ | $a_{512} = 0$ | $a_{513} = 0$ | |
| | ry | rm | bm | bc | gc | gy | |

TABLE 6

| | HUE | COLOR SATULATION | BRIGHTNESS |
|---|---|---|---|
| RED | Hr | Sr | Vr |
| GREEN | Hg | Sg | Vg |
| BLUE | Hb | Sb | Vb |
| YELLOW | Hy | Sy | Vy |
| MAGENTA | Hm | Sm | Vm |
| CYAN | Hc | Sc | Vc |

As a matter of course, this set of matrix coefficients is only an example as described in Embodiment 1. Matrix coefficients for adjusting color tones of neutral colors (red-yellow, red-magenta, blue-magenta, blue-cyan, green-cyan, and green-yellow) are also conceivable as another example.

For instance, in a case of a panel in which the brightness of an yellow pixel (D4) is significantly higher than a red pixel (D1), a color among red-yellow neutral colors, which is closer to red than yellow, looks yellowish as compared to the desired color. To solve this problem, the yellowish tendency in the red-yellow area can be restrained using adjusting parameters Qry or Qry', that is, by subtracting Qry×ry from d4 or subtracting Qry'×ry. On the other hand, the reddish tendency in the red-yellow can be restrained using an adjusting parameter Pry (by subtracting Pry×ry from d1).

Figure 14:
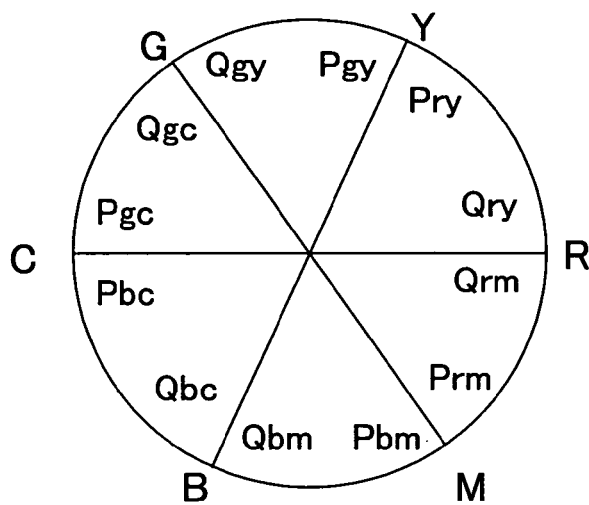
FIG. 14 illustrates color adjustment of neutral colors.

To realize these adjustments, the matrix coefficients of the matrix $A_{5\times13}$ in the equation (6) are set as in Table. 7. The adjusting parameters for adjusting the color tones of neutral colors are defined as in Table. 8. Also, FIG. 14 shows a chromaticity diagram on which the colors adjusted by these parameters are disposed.

and which are sensed as similar colors, such as R and D1, G and D2, B and D3, Y and D4, and C and D5 in FIG. 4.

In this manner, in the color conversion circuit 302, the adjustment of colors represented by the signal after the conversion can be performed using intuitively-understandable parameters, as in the case of Embodiment 1.

TABLE 7

| | ro | go | bo | yo | mo | co | wo |
|---|---|---|---|---|---|---|---|
| d1(R) | $a_{11}$ = Vr − Sr | $a_{12}$ = Sg/2 | $a_{13}$ = −Hb | $a_{14}$ = +Hy | $a_{15}$ = Vm − Sm/2 − Hm | $a_{16}$ = Sc | $a_{17}$ = 1 |
| d2(G) | $a_{21}$ = 0 | $a_{22}$ = Vg + Sg | $a_{23}$ = −0 | $a_{24}$ = −Hy | $a_{25}$ = Sm | $a_{26}$ = +Hc | $a_{27}$ = 1 |
| d3(B) | $a_{31}$ = +Hr | $a_{32}$ = Sg/2 | $a_{33}$ = Vb + Sb | $a_{34}$ = Sy | $a_{35}$ = Vm − Sm/2 + Hm | $a_{36}$ = −Hc | $a_{37}$ = 1 |
| d4(Y) | $a_{41}$ = −Hr | $a_{42}$ = +Hg | $a_{43}$ = Sb | $a_{44}$ = Vy − Sy | $a_{45}$ = 0 | $a_{46}$ = 0 | $a_{47}$ = 1 |
| d5(C) | $a_{51}$ = +Sr | $a_{52}$ = −Hg | $a_{53}$ = +Hb | $a_{54}$ = 0 | $a_{55}$ = 0 | $a_{56}$ = Vc − Sc | $a_{57}$ = 1 |
| d1(R) | $a_{18}$ = −Pry | $a_{19}$ = Prm | $a_{110}$ = −Qbm | $a_{111}$ = 0 | $a_{112}$ = 0 | $a_{113}$ = −Qgy' | |
| d2(G) | $a_{28}$ = −Qry' | $a_{29}$ = 0 | $a_{210}$ = 0 | $a_{211}$ = −Qbc' | $a_{212}$ = −Pgc | $a_{213}$ = −Pgy | |
| d3(B) | $a_{38}$ = 0 | $a_{39}$ = −Qrm | $a_{310}$ = −Pbm | $a_{311}$ = −Pbc | $a_{312}$ = −Qgc' | $a_{313}$ = 0 | |
| d4(Y) | $a_{48}$ = −Qry | $a_{49}$ = 0 | $a_{410}$ = 0 | $a_{411}$ = 0 | $a_{412}$ = 0 | $a_{413}$ = −Qgy | |
| d5(C) | $a_{58}$ = 0 | $a_{59}$ = 0 | $a_{510}$ = 0 | $a_{511}$ = −Qbc | $a_{512}$ = −Qgc | $a_{513}$ = 0 | |
| | ry | rm | bm | bc | gc | gy | |

TABLE 8

| | |
|---|---|
| To make red-yellow area reddish | Qry, Qry' |
| To make yellow-green area greenish | Qgy, Qgy' |
| To make green-cyan area greenish | Qgc, Qgc' |
| To make cyan-blue area bluish | Qbc, Qbc' |
| To make blue-magenta area bluish | Qbm |
| To make magenta-red area reddish | Qrm |
| To make red-yellow area yellowish | Pry |
| To make yellow-green area yellowish | Pgy |
| To make green-cyan area incline to cyan | Pgc |
| To make cyan-blue area incline to cyan | Pbc |
| To make blue-magenta area incline to magenta | Pbm |
| To make magenta-blue area incline to magenta | Prm |

In this manner, also in the color conversion circuit 302, by the adjustment of the matrix coefficients as in the case of Embodiment 1, the adjustment of colors represented by the signal after the conversion can be performed using intuitively-understandable parameters. In the color conversion circuit 302, the color component extraction section 32 extracts a greater number of color components as compared to the color conversion circuit 102 of Embodiment 1 and the color conversion circuit 202 of Embodiment 2. On this account, the color conversion circuit 302 makes it possible to perform the adjustment in a more detailed manner.

As described above, the color conversion circuit 302 is a color signal converter that converts a three-primary-color signal to a 5-color signal. Since the present embodiment assumes that the multicolor display panel 101 has 5-color pixels, the color conversion circuit 102 performs the conversion to a 5-color signal. In the present invention, however, the multicolor display panel 101 may be a display panel having n-color pixels corresponding to n colors (n≧4). In such a case, the color conversion circuit 302 performs the conversion to an n-color signal corresponding to the number of the colors of the pixels.

The color conversion circuit 302 includes the color component extraction section 32 serving as a first color signal generation module that generates, by subjecting the three-primary-color signal to isochromatic conversion, an m-color signal made up of m color components (m≧n) including colors equivalent to those of the color components of the n-color signal. It is noted that the color components having equivalent colors are two color components whose positions on a chromaticity diagram are relatively close to each other In the color component extraction section 32, m color components are made up of: primary-color components of the three-primary-color signal; complementary-color components corresponding to the respective primary-color components; neutral color components between the primary-color components and the complementary color components; and an achromatic color component. With this, as the above-described patterns [1]-[6] and sub-patterns <1>-<12>show, the m-color signal is generated by performing simple calculations such as subtracting one primary-color component from another primary-color component.

As in Embodiment 1, the color conversion circuit 302 is further provided with the matrix generation section 36 serving as a coefficient change module that changes matrix coefficients in the matrix operation section 33.

The characteristic feature of the color conversion circuit 302 can be rephrased as follows: the color conversion circuit 302 is a signal converter that converts a three-dimensional video signal to an n-dimensional video signal supplied to the multicolor display panel 101 including n-color (n≧4) pixels. The color conversion circuit 302 (i) identifies which one of six patterns categorized in accordance with the magnitude relation of gray levels of the three-dimensional video signal is matched with the pattern of the actually-inputted three-dimensional video signal, (ii) extracts a plurality of color components by performing an operation corresponding to each pattern, and (iii) reorganizes the extracted color components into the input signal supplied to the multicolor display panel 101. Furthermore, the color conversion circuit 302 generates a multi-dimensional video signal, using (I) a first module that extracts red (ro), green (go), blue (bo), yellow (yo), cyan (co), magenta (mo), and white (wo) components by identifying six patterns from the gray levels of the three-dimensional signal and performing an operation corresponding to each pattern, and also extracts red-yellow (ry), red-magenta (rm), blue-magenta (bm), blue-cyan (bc), green-cyan (gc), and green-yellow (gy) components by identifying twelve sub-patterns from the aforesaid components, and (II) a second module that reorganizes these components, by means of the aforesaid matrix operation in line with n.

With this color conversion circuit 302, a multi-dimensional video signal corresponding to a multicolor display apparatus is generated by performing an operation based on a typically-used three-dimensional video signal.

It is noted that the matrix coefficients in the matrix of the equation (6) may be changed in accordance with the result of the identification of six patterns and twelve sub-patterns by the color component extraction section 32.

Also, the components ro, go, bo, yo, mo, co, wo, ry, rm, bm, bc, gc, and gy may be subjected to the matrix operation by the matrix operation section 33, after being subjected to nonlinear processing.

Now, a variant example of the aforesaid matrix coefficients will be discussed.

<Auxiliary Illumination by Color Mixing>

When one pixel is divided into parts corresponding to not less than four colors, the open area ratio is generally smaller than the open area ratio in a case where one pixel is divided into three colors, so that the brightness of each pixel is relatively decreased. As to the parts corresponding to red, green and blue, the decrease of the brightness is usually unavoidable. Meanwhile, as to the parts corresponding to yellow, cyan, and magenta, the decrease of the brightness can be avoided in the following manner.

For instance, when yellow color is displayed, the yellow color is generated by performing auxiliary illumination of the R and G pixels, in order to compensate the brightness of the Y pixel. This is because the yellow color can be generated by additive color mixing of red and green. In similar manners, cyan color can be generated by additive color mixing of green and blue, and magenta can be generated by additive color mixing of red and blue.

To perform this type of adjustment, the matrix coefficients of the matrix $A_{5 \times 13}$ in the equation (6) is set as in Table. 9. The matrix coefficients of Table. 9 is different from the matrix coefficients in Table. 7 in that Vy is added to $a_{14}$ and $a_{24}$, and Vc is added to $a_{26}$ and $a_{36}$. The value Vy is an adjusting parameter with which not only the Y pixel but also R and G pixels are used for reproducing yellow color, while the value Vc is an adjusting parameter with which not only the C pixel but also the G and B pixels are used for reproducing cyan color. It is noted that, since the basic colors of the 5-color display panel 101 of the present embodiment do not include magenta, magenta color is always reproduced by the R and B pixels (see Table. 7).

a color space. According to the essay, while cyan and magenta do not require a high brightness, yellow requires a high brightness.

In the case where the brightness of yellow color is reproduced not only by the Y pixel but also by the R and G pixels, the yellowish tendency in the red-yellow area can be reduced preferably by increasing the ratio of the subtraction of Qry'×ry from d2 as compared to the subtraction of Qry×ry from d4. In short, it is preferable that Qry<Qry'. With this, the decrease of the color reproduction range of highly-bright yellow color can be restrained.

<Making Matrix Coefficient into Function>

In the adjustments above, the matrix coefficients of the matrix $A_{5 \times 13}$ in the equation (6) are constants that can be changed by mean of the adjustment signal. Alternatively, these matrix coefficients may be made into functions. The following will describe a case where the matrix coefficients are made into functions (i.e. functionalization).

First, the functionalization of the matrix coefficients performed in order to keep a gray level to be less than the upper allowable limit (1) of the gray levels as much as possible will be discussed.

Figure 15:
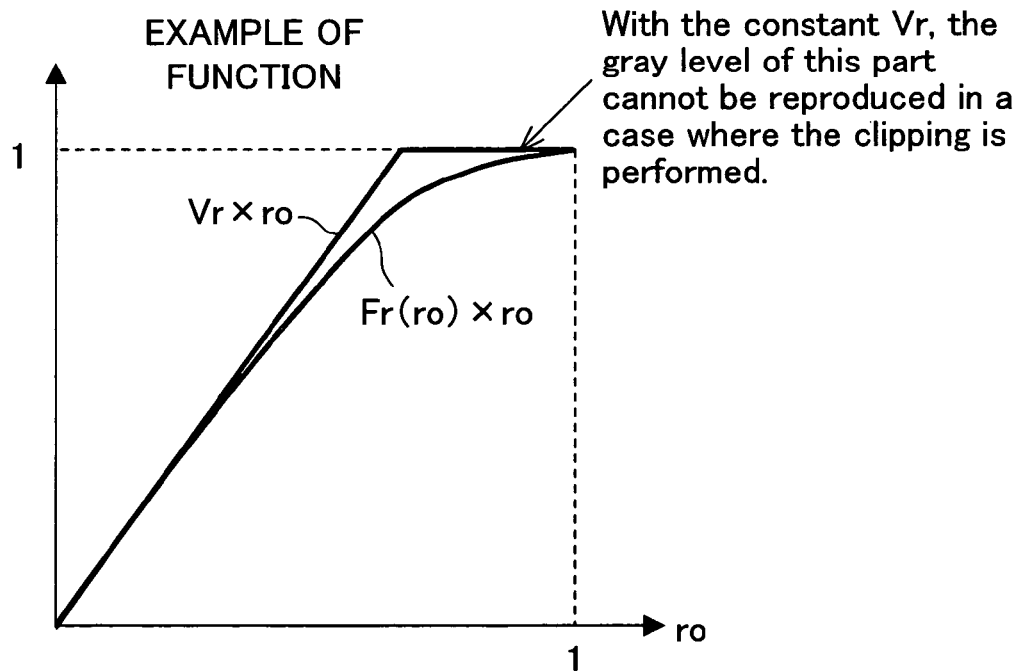
FIG. 15 is a graph showing an example of a function used as matrix coefficients.

For instance, provided that the matrix coefficients in Table. 7 are used, if the adjusting parameter Vr is not less than 1 in the term Vr×ro in the calculation for figuring out d1, the result of the term Vr×ro exceeds the upper allowable limit (1) of d1, as shown in FIG. 15. Since d1 exceeding the maximum value (1) is set at 1 by the clipping, the gray levels in this range cannot be reproduced.

To solve this problem, in stead of the adjusting parameter Vr, an adjusting function Fr(ro) (Fr(ro) monotonously increases with respect to ro, and Fr(1)=1; see FIG. 15). With this, it is possible to keep d1 to be not more than the maximum value (1) as much as possible.

To perform this adjustment, the matrix coefficients of the matrix $A_{5 \times 13}$ in the equation (6) is set as in Table. 10. The matrix coefficients in Table. 10 is different from the matrix coefficients in Table. 7 in that, instead of the adjusting parameters Vr, Vg, Vb, Vy, Vm, and Vc, adjusting functions Fr(ro), Fg(go), Fb(bo), Fy(yo), Fm(mo), and FC(co) are used in the

TABLE 9

| | ro | go | bo | yo | mo | co | wo |
|---|---|---|---|---|---|---|---|
| d1(R) | $a_{11}$ = Vr − Sr | $a_{12}$ = Sg/2 | $a_{13}$ = −Hb | $a_{14}$ = Vy + Hy | $a_{15}$ = Vm − Sm/2 − Hm | $a_{16}$ = Sc | $a_{17}$ = 1 |
| d2(G) | $a_{21}$ = 0 | $a_{22}$ = Vg + Sg | $a_{23}$ = −0 | $a_{24}$ = Vy − Hy | $a_{25}$ = Sm | $a_{26}$ = Vc + Hc | $a_{27}$ = 1 |
| d3(B) | $a_{31}$ = +Hr | $a_{32}$ = Sg/2 | $a_{33}$ = Vb + Sb | $a_{34}$ = Sy | $a_{35}$ = Vm − Sm/2 + Hm | $a_{36}$ = Vc − Hc | $a_{37}$ = 1 |
| d4(Y) | $a_{41}$ = −Hr | $a_{42}$ = +Hg | $a_{43}$ = Sb | $a_{44}$ = Vy − Sy | $a_{45}$ = 0 | $a_{46}$ = 0 | $a_{47}$ = 1 |
| d5(C) | $a_{51}$ = +Sr | $a_{52}$ = −Hg | $a_{53}$ = +Hb | $a_{54}$ = 0 | $a_{55}$ = 0 | $a_{56}$ = Vc − Sc | $a_{57}$ = 1 |
| d1(R) | $a_{18}$ = −Pry | $a_{19}$ = Prm | $a_{110}$ = −Qbm | $a_{111}$ = 0 | $a_{112}$ = 0 | $a_{113}$ = −Qgy' | |
| d2(G) | $a_{28}$ = −Qry' | $a_{29}$ = 0 | $a_{210}$ = 0 | $a_{211}$ = −Qbc' | $a_{212}$ = −Pgc | $a_{213}$ = −Pgy | |
| d3(B) | $a_{38}$ = 0 | $a_{39}$ = −Qrm | $a_{310}$ = −Pbm | $a_{311}$ = −Pbc | $a_{312}$ = −Qgc' | $a_{313}$ = 0 | |
| d4(Y) | $a_{48}$ = −Qry | $a_{49}$ = 0 | $a_{410}$ = 0 | $a_{411}$ = 0 | $a_{412}$ = 0 | $a_{413}$ = −Qgy | |
| d5(C) | $a_{58}$ = 0 | $a_{59}$ = 0 | $a_{510}$ = 0 | $a_{511}$ = −Qbc | $a_{512}$ = −Qgc | $a_{513}$ = 0 | |
| | ry | rm | bm | bc | gc | gy | |

Note that, this auxiliary illumination by the additive color mixing is particularly effective in the case of reproducing yellow color. This is because, in a typical image, the yellow color must particularly be thick and have a high brightness. Pointer clarifies this in his article (M. R. Pointer, The Gamut of Real Surface Colors, COLOR research and application Vol.5 Number 3, Fall (1980) p.145). In this article, all types of colors and brightness in existence are represented as points on matrix coefficients in Table. 10. These adjusting functions Fr(ro), Fg(go), Fb(bo), Fy(yo), Fm(mo), and FC(co) monotonously increase with respect to ro, go, bo, yo, mo, and co, respectively, and, Fr(1)=1, Fg(1)=1, Fb(1)=1, Fy(1)=1, Fm(1)=1, Fc(1)=1.

These adjusting functions Fr(ro), Fg(go), Fb(bo), Fy(yo), Fm(mo), and FC(co) may be predetermined functions, or may be functions adjusted by the adjustment signal.

TABLE 10

| | ro | go | bo | yo | mo | co | wo |
|---|---|---|---|---|---|---|---|
| d1(R) | $a_{11}$ = Fr − Sr | $a_{12}$ = Sg/2 | $a_{13}$ = −Hb | $a_{14}$ = +Hy | $a_{15}$ = Fm − Sm/2 − Hm | $a_{16}$ = Sc | $a_{17}$ = 1 |
| d2(G) | $a_{21}$ = 0 | $a_{22}$ = Fg + Sg | $a_{23}$ = −0 | $a_{24}$ = −Hy | $a_{25}$ = Sm | $a_{26}$ = +Hc | $a_{27}$ = 1 |
| d3(B) | $a_{31}$ = +Hr | $a_{32}$ = Sg/2 | $a_{33}$ = Fb + Sb | $a_{34}$ = Sy | $a_{35}$ = Fm − Sm/2 + Hm | $a_{36}$ = −Hc | $a_{37}$ = 1 |
| d4(Y) | $a_{41}$ = −Hr | $a_{42}$ = +Hg | $a_{43}$ = Sb | $a_{44}$ = Fy − Sy | $a_{45}$ = 0 | $a_{46}$ = 0 | $a_{47}$ = 1 |
| d5(C) | $a_{51}$ = +Sr | $a_{52}$ = −Hg | $a_{53}$ = +Hb | $a_{54}$ = 0 | $a_{55}$ = 0 | $a_{56}$ = Fc − Sc | $a_{57}$ = 1 |
| d1(R) | $a_{18}$ = −Pry | $a_{19}$ = Prm | $a_{110}$ = −Qbm | $a_{111}$ = 0 | $a_{112}$ = 0 | $a_{113}$ = −Qgy' | |
| d2(G) | $a_{28}$ = −Qry' | $a_{29}$ = 0 | $a_{210}$ = 0 | $a_{211}$ = −Qbc' | $a_{212}$ = −Pgc | $a_{213}$ = −Pgy | |
| d3(B) | $a_{38}$ = 0 | $a_{39}$ = −Qrm | $a_{310}$ = −Pbm | $a_{311}$ = −Pbc | $a_{312}$ = −Qgc' | $a_{313}$ = 0 | |
| d4(Y) | $a_{48}$ = −Qry | $a_{49}$ = 0 | $a_{410}$ = 0 | $a_{411}$ = 0 | $a_{412}$ = 0 | $a_{413}$ = −Qgy | |
| d5(C) | $a_{58}$ = 0 | $a_{59}$ = 0 | $a_{510}$ = 0 | $a_{511}$ = −Qbc | $a_{512}$ = −Qgc | $a_{513}$ = 0 | |
| | ry | rm | bm | bc | gc | gy | |

Now, a variant example of the aforesaid auxiliary illumination by color mixing (see Table. 10) is discussed.

Figure 16:
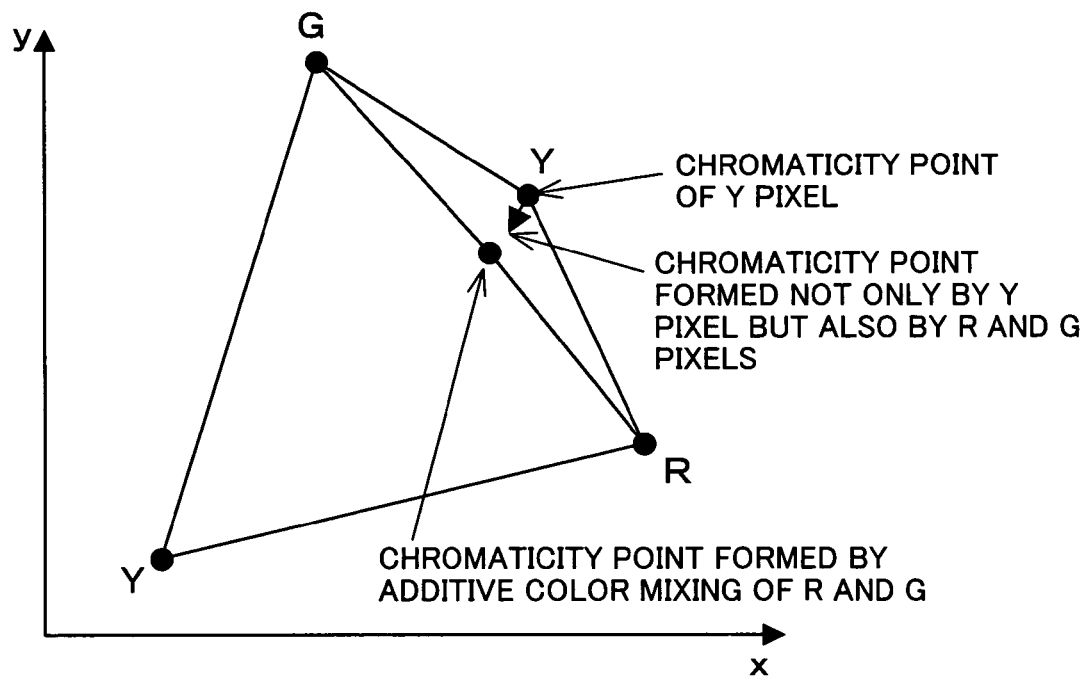
FIG. 16 is a chromaticity diagram showing the relationship between a chromaticity point as a result of additive color mixing of R and G pixels and a chromaticity point of a Y pixel.

For instance, a chromaticity point of a color reproduced by additive color mixing of R and G is on the lower color saturation side as compared to a chromaticity point of a color reproduced sorely by a Y pixel. For this reason, when the adjustment of the brightness by color mixing is performed, an actual color reproduction range is at times narrower than a color reproduction range that is originally realized by the chromaticity points of pixels. This is because, as shown in FIG. 16, the chromaticity of the yellow color generated by the additive color mixing of R and G is on the white side as compared to the chromaticity of the Y pixel.

This decrease of the color reproduction range can be restrained by setting the matrix coefficients of the matrix $A_{5\times13}$ in the equation (6), in the following manner.

For instance, an yellow color that has low brightness and can be reproduced sorely by the Y pixel is reproduced sorely by the Y pixel, while an yellow color having a higher brightness is reproduced by enhancing the yellow color by performing the additive color mixing of R and G.

With this, while an yellow color with a low brightness is reproduced in line with the original color reproduction range, an yellow color with a high brightness is also reproduced even if the color reproduction range is narrowed to some extent. This arrangement can be applicable for reproducing cyan and magenta colors as well.

To perform this type of adjustment, the matrix coefficients of the matrix $A_{5\times13}$ in the equation (6) is set as in Table. 11. The matrix coefficients in Table 11. is different from the matrix coefficients in Table 10. in that, in the matrix coefficients in Table 11, an adjusting function Fy'(yo) is added to $a_{14}$ and $a_{24}$, while an adjusting function Fc'(co) is added to $a_{26}$ and $a_{36}$.

Figure 17:
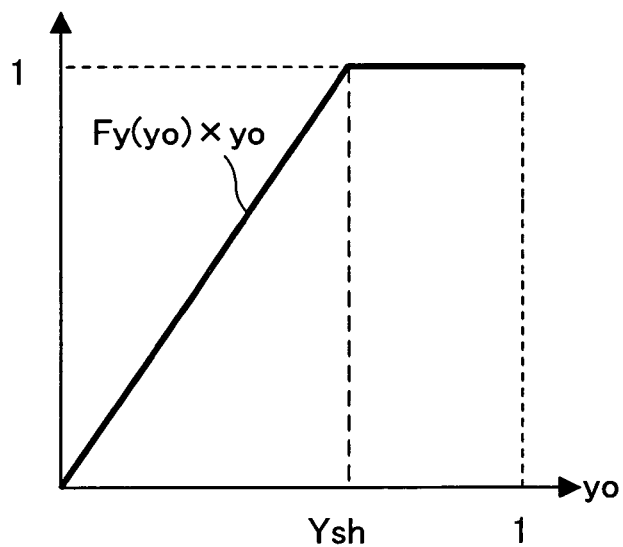
FIG. 17 is a graph showing an example of functions used as matrix coefficients.
Figure 18:
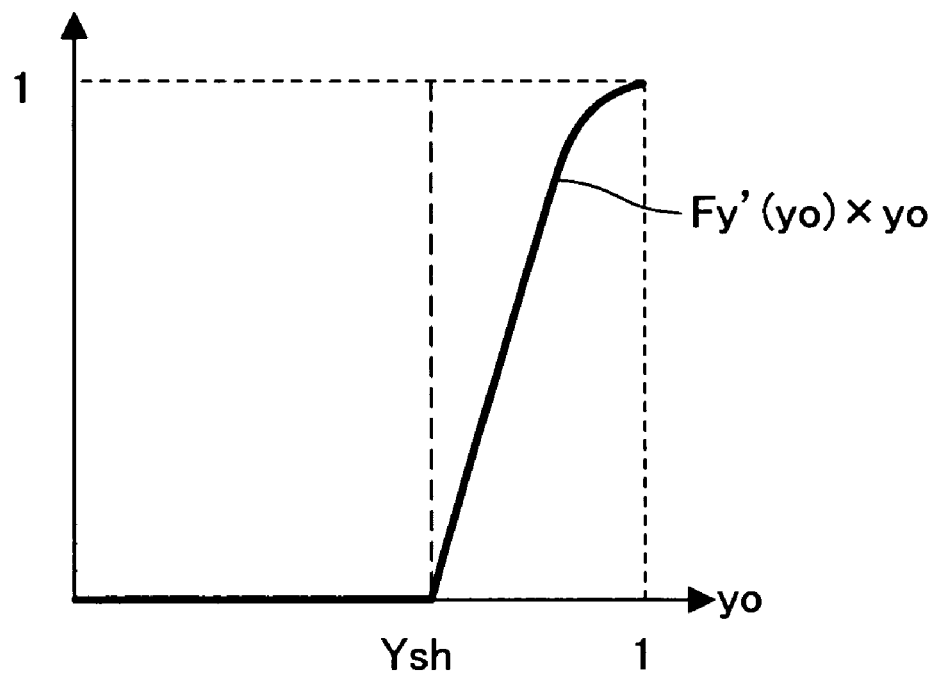
FIG. 18 is a graph showing an example of functions used as matrix coefficients.

In this table, the adjusting functions Fy(yo) and Fy'(yo) are, for example, set as shown in FIGS. 17 and 18. That is, in a case where an yellow color is reproduced, the yellow color is reproduced sorely by the Y pixel if the value of yo is less than a threshold Ysh, while the yellow color is enhanced by the color mixing of R and G if the value of yo is not less than the threshold Ysh. This threshold Ysh is a gray level of yo when the brightness of the Y pixel is at the maximum. The adjusting functions Fc(co) and Fc'(co) are set in a similar manner.

VARIANT EXAMPLE (Subtractive Color Mixing)

The embodiments above presuppose that an additive color mixing signal is used, primary-color components of the three-primary-color signal are red, green and blue, complementary color components are yellow, magenta, and cyan, and an achromatic color component is white.

The present invention is applicable not only when the additive color mixing signal is used but also when a subtractive color mixing signal is used. In the latter case, primary-color components of the three-primary-color signal are yellow, magenta, and cyan, complementary color components are red green, and blue, and an achromatic color component is white.

When the subtractive color mixing signal is adopted, the color component extraction section 12 of Embodiment 1 or 2 performs the following operation: provided that a video signal PS1 is a YMC signal and represents gray levels y, m, and c ($0 \leq y, m, c \leq 1$), the color component extraction section 12 works out gray levels ro, go, bo, yo, mo, co, and wo of red, green, blue, yellow, magenta, cyan, and white color components, in the following manner:

[1] In a case where $y \geq m \geq c$, $ro = (m-c)$ $yo = (y-m)$

TABLE 11

| | ro | go | bo | yo | mo | co | wo |
|---|---|---|---|---|---|---|---|
| d1(R) | $a_{11}$ = Fr − Sr | $a_{12}$ = Sg/2 | $a_{13}$ = −Hb | $a_{14}$ = Fy' + Hy | $a_{15}$ = Fm − Sm/2 − Hm | $a_{16}$ = Sc | $a_{17}$ = 1 |
| d2(G) | $a_{21}$ = 0 | $a_{22}$ = Fg + Sg | $a_{23}$ = −0 | $a_{24}$ = Fy' − Hy | $a_{25}$ = Sm | $a_{26}$ = Fc' + Hc | $a_{27}$ = 1 |
| d3(B) | $a_{31}$ = +Hr | $a_{32}$ = Sg/2 | $a_{33}$ = Fb + Sb | $a_{34}$ = Sy | $a_{35}$ = Fm − Sm/2 + Hm | $a_{36}$ = Fc' − Hc | $a_{37}$ = 1 |
| d4(Y) | $a_{41}$ = −Hr | $a_{42}$ = +Hg | $a_{43}$ = Sb | $a_{44}$ = Fy − Sy | $a_{45}$ = 0 | $a_{46}$ = 0 | $a_{47}$ = 1 |
| d5(C) | $a_{51}$ = +Sr | $a_{52}$ = −Hg | $a_{53}$ = +Hb | $a_{54}$ = 0 | $a_{55}$ = 0 | $a_{56}$ = Fc − Sc | $a_{57}$ = 1 |
| d1(R) | $a_{18}$ = −Pry | $a_{19}$ = Prm | $a_{110}$ = −Qbm | $a_{111}$ = 0 | $a_{112}$ = 0 | $a_{113}$ = −Qgy' | |
| d2(G) | $a_{28}$ = −Qry' | $a_{29}$ = 0 | $a_{210}$ = 0 | $a_{211}$ = −Qbc' | $a_{212}$ = −Pgc | $a_{213}$ = −Pgy | |
| d3(B) | $a_{38}$ = 0 | $a_{39}$ = −Qrm | $a_{310}$ = −Pbm | $a_{311}$ = −Pbc | $a_{312}$ = −Qgc' | $a_{313}$ = 0 | |
| d4(Y) | $a_{48}$ = −Qry | $a_{49}$ = 0 | $a_{410}$ = 0 | $a_{411}$ = 0 | $a_{412}$ = 0 | $a_{413}$ = −Qgy | |
| d5(C) | $a_{58}$ = 0 | $a_{59}$ = 0 | $a_{510}$ = 0 | $a_{511}$ = −Qbc | $a_{512}$ = −Qgc | $a_{513}$ = 0 | |
| | ry | rm | bm | bc | gc | gy | | go=bo=mo=co=0 wo=1−y

[2] In a case where y≧c>m, go=(c−m)

yo=(y−c)

ro=bo=mo=co=0 wo=1−y

[3] In a case where c>y≧m, go=(y−m)

co=(c−y)

ro=bo=yo=mo=0 wo=1−c

[4] In a case where c>m>y, bo=(m−y)

co=(c−m)

ro=go=yo=mo=0 wo=1−c

[5] In a case where m≧c>y, bo=(c−y)

mo=(m−c)

ro=go=yo=co=0 wo=1−m

[6] In a case where m>y≧c, ro=(y−c)

mo=(m−y)

go=bo=yo=mo=0 wo=1−m

The matrix operation section 13 or 23 in Embodiment 1 or 2 generates a video signal PS3 made up of d1 through d5 or d1 through d4, by working out the equation (1) as in Embodiment 1 or 2, using ro, go, bo, yo, mo, co, and wo figured out by the color component extraction section 12. The matrix coefficients in the equation (1) are set in a manner similar to those in Embodiment 1 or 2.

When the subtractive color mixing signal is adopted, the color component extraction section 32 of Embodiment 3 performs the following operation: provided that a video signal PS1 is a YMC signal and represents gray levels y, m, and c (0≦y, m, c≦1), the color component extraction section 32 works out gray levels ro, go, bo, yo, mo, co, wo, ry, rm, bm, bc, gc, and gy of red, green, blue, yellow, magenta, cyan, white, red-yellow, red-magenta, blue-magenta, blue-cyan, green-cyan, and green-yellow color components, in the following manner:

[1] In a case where y≧m≧c, ro=(m−c)

yo=(y−m)

go=bo=mo=co=0 wo=1−y

<1> if ro≧yo, ry=yo
<2> if ro<yo, ry=ro gy=gc=bc=bm=rm=0

[2] In a case where y≧c>m, go=(c−m)

yo=(y−c)

ro=bo=mo=co=0 wo=1−y

<3> if go≧yo, gy=yo
<4> if go<yo, gy=go ry=gc=bc=bm=rm=0

[3] In a case where c>y≧m, go=(y−m)

co=(c−y)

ro=bo=yo=mo=0 wo=1−c

<5> if go≧co, gc=co
<6> if go<co, gc=co ry=gy=bc=bm=rm=0

[4] In a case where c>m>y, bo=(m−y)

co=(c−m)

ro=go=yo=mo=0 wo=1−c

<7> if bo≧co, bc=co
<8> if bo<co, bc=bo ry=gy=gc=bm=rm=0

[5] In a case where m≧c>y, bo=(c−y)

mo=(m−c)

ro=go=yo=co=0 wo=1−m

<9> if bo≧mo, bm=mo
<10> if bo<mo, bm=bo ry=gy=gc=bc=rm=0

[6] In a case where m>y≧c, ro=(y−c)

mo=(m−y)

go=bo=yo=mo=0 wo=1−m

<11> if ro≧mo, rm=mo
<12> if ro<yo, rm=ro ry=gy=gc=bc=bm=0

The matrix operation section 33 of Embodiment 3 generates a video signal PS3 made up of d1 through d5, by, as in Embodiment 3, working out the equation (6) using ro, go, bo, mo, co, wo, ry, rm, bm, bc, gc, and gy figured out by the color component extraction section 32. The matrix coefficients in the equation (6) are set in a manner similar to Embodiment 1.

(Calculation in Color Component Extraction Section)

Each of the color component extraction sections 12 and 32 adopted in the aforesaid embodiments extracts color components by identifying 6 patterns with reference to the magnitude relation of r, g, b or y, m, c, and calculating a difference corresponding to each pattern. However, the color extraction is not necessarily performed in this way. The following is an example of another color component extraction method.

For instance, the color component extraction can be performed by the calculation below. Color components ro, go, bo, yo, mo, co, and wo are worked out from inputted r, g, and b, in the following manner.

$$rg=r-g$$

$$rb=r-b$$

$$gr=g-r$$

$$gb=g-b$$

$$br=b-r$$

$$bg=b-g$$

Each of rg, rb, gr, gb, br, and bg is set at 0 if the value is negative.

$$ro=\min(rg, rb)$$

$$go=\min(gr, gb)$$

$$bo=\min(br, bg)$$

$$yo=\min(rb, gb)$$

$$mo=\min(rg, bg)$$

$$co=\min(gr, br)$$

$$wo=\min(r, g, b)$$

(In these equations, the function min( ) returns the smallest value in the bracket.)

These components worked out above can be used as the values used in the above-described embodiments.

For instance, in a case where r>g>b, rg, rb, and gb are positive while gr, br, and bg are negative. Since a negative value is set at 0, gr, br, and bg are 0. Then, as the component ro, the smaller one of rg and rb is chosen. Since r>g>b, rg is chosen in this case. As a result, ro=rg=(r−g). In a similar manner, yo=(g−b) and wo=b, while the remaining components are 0 because one of the values in each function min( ) is 0.

In this manner, the color component extraction can be realized without identifying 6 patterns from the magnitude relation of r, g, and b.

As a matter of course, it is possible to generate neutral colors between the color components by further identifying sub-patterns as in the case of Embodiment 3.

The color component extraction can be realized also in the case of the subtractive color mixing, using the following calculation.

$$ym=y-m$$

$$yc=y-c$$

$$my=m-y$$

$$mc=m-c$$

$$cy=c-y$$

$$cm=c-m$$

Each of ym, yc, my, mc, cy, and cm is set at 0 if the value is negative.

$$ro=\min(yc, mc)$$

$$go=\min(ym, cm)$$

$$bo=\min(my, cy)$$

$$yo=\min(ym, yc)$$

$$mo=\min(my, mc)$$

$$co=\min(cy, cm)$$

$$wo=\min(1-y, 1-m, 1-c)$$

(In these equations, the function min( ) returns the smallest value in the bracket.)

The color components can be extracted as above.

(Application to Apparatuses Other Than Display Apparatus)

In Embodiments 1-3, the color conversion circuit 102, 202, or 302 as the color signal converter of the present invention is used for a color display apparatus. In addition to this, the present invention can be adopted to various types of apparatuses that require the conversion of a three-primary-color signal to a n-color signal (n≧4). For instance, the color signal converter of the present invention can be used for image forming apparatuses such as printers and photocopiers.

(Color Signal Conversion Program)

The functional blocks of the color conversion circuit 102, 202, and 302 of Embodiments 1-3, i.e. the inverse gamma correction section 11, the matrix operation sections 13 and 23, the clipping section 14, the gamma correction section 15, and the matrix generation sections 16 and 26 can be realized not only by hardware but also partially or entirely by software.

In a case where the aforesaid functional blocks are realized by software, an arrangement equivalent to the color conversion circuit 102, 202, or 302 is realized using a computer. This computer includes a CPU (Central Processing Unit) for executing various types of programs and a RAM (Random Access Memory) serving as a work area for executing a program. On this computer, a color signal conversion program for realizing the aforesaid functional blocks is run, so that the computer operates as the functional blocks.

The color signal conversion program may be supplied from a storage medium to the computer, or may be supplied to the computer via a communications network.

The storage medium storing the color signal conversion program may be detachable from the computer or may be incorporated into the computer. The storage medium may be attached to the computer in such a manner as to allow the computer to directly read out program code, or may be provided as an external storage device that allows the computer to read out program code via a program reading device.

Examples of the storage medium are: tapes such as a magnetic tape and a cassette tape; magnetic disks such as a flexible disk and a hard disk; disks such as a CD-ROM, MO, MD, DVD, and CD-R; cards such as an IC card (including a memory card) and an optical card; or a semiconductor memory such as a mask ROM, an EPROM (electrically programmable read only memory), EEPROM (electrically erasable programmable read only memory), and a flash ROM.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, a color signal conversion apparatus of the present invention, which converts a three-primary-color signal to an n-color signal ($n \geq 4$), comprises: a first color signal generation module for generating, by subjecting the three-primary-color signal to isochromatic conversion, an m-color signal made up of m color components ($m \geq n$) including respective color components that are equivalent in terms of color to color components of the n-color signal; and a second color signal generation module for generating the color components of the n-color signal, by performing linear combination of the color components of the m-color signal.

A color signal conversion method of the present invention, for converting a three-primary-color signal to an n-color signal ($n \geq 4$), comprises the steps of: generating, by subjecting the three-primary-color signal to isochromatic conversion, an m-color signal made up of m color components ($m \geq n$) including respective color components that are equivalent in terms of color to color components of the n-color signal; and generating the color components of the n-color signal, by performing linear combination of the color components of the m-color signal.

According to the above-described arrangement and method, a three-primary-color signal that is an original signal is subjected to isochromatic conversion, generating an m-color signal made up of m color components ($m \geq n$) which are equivalent in terms of color with color components of a targeted n-color signal. The isochromatic conversion is performed in such a manner that a combination of color components representing a particular color is converted to a combination of other color components, without changing the represented color. The color components having equivalent colors are two color components whose positions on a chromaticity diagram are relatively close to each other and which are sensed as similar colors. The color components having equivalent colors include two identical color components whose positions on the chromaticity diagram are identical with each other.

According to the above-described arrangement and method, furthermore, the color components of the n-color signal generated as a result of the conversion are generated by the linear combination of the color components of the m-color signal generated as above. The linear combination of the color components is performed in such a manner that multiplication of coefficients and addition are performed with respect to each color component.

When the color components of the n-color signal are generated by the linear combination of the color components of the m-color signal, intuitively-understandable parameters are used for adjusting the colors represented by the n-color signal, and the coefficients of the linear combination are determined by simple calculations of these parameters (see Tables. 1-8). As the parameters, it is possible to adopt, for instance, values (cf. Tables 2, 4, and 6) indicating hue, color saturation, and brightness of each color component of the m-color signal or n-color signal and the values (cf. Table. 8) that indicate, in a neutral color between the color components, which one of the color components is enhanced.

In this manner, the above-described arrangement and method makes it possible to perform the adjustment of colors represented by the n-color signal after the conversion, by means of intuitively-understandable parameters.

The aforesaid color signal conversion apparatus of the present invention preferably includes a coefficient change module for changing coefficients of the linear combination performed by the second color signal generation module.

According to this arrangement, the coefficients for the linear combination by which the color components of the n-color signal are generated can be changed by the coefficient change module. This adjustment may be performed at the time of manufacture by an adjusting device incorporated into the color signal conversion apparatus. However, if the coefficient change module is incorporated into the color signal conversion apparatus as above, the adjustment can be performed at any time. In this manner, the foregoing arrangement allows the user to perform the adjustment at any time.

The aforesaid color signal conversion apparatus of the present invention is preferably arranged in such a manner that, in the first color signal generation module, said m color components are made up of: primary color components of the three-primary-color signal; complementary color components corresponding to the primary color components, respectively; and an achromatic color component.

According to this arrangement, the m-color signal can be generated by performing simple calculations such as subtracting one primary-color component from another primary-color component.

The aforesaid color signal conversion apparatus of the present invention may be arranged in such a manner that, in the first color signal generation module, said m color components are made up of: primary color components of the three-primary-color signal; complementary color components corresponding to the primary color components, respectively; neutral color components between the primary color components and the complementary color components; and an achromatic color component.

This arrangement makes it possible to perform the adjustment in a more subtle manner, because the adjustment is performed additionally using the neutral components.

If the three-primary-color signal is an additive color mixing signal, the following may hold true: the primary color components are red, green, and blue components, the complementary color components are yellow, magenta, and cyan components, and the achromatic color component is a white component.

If the three-primary-color signal is a subtractive color mixing signal, the following may hold true: the primary color components are yellow, magenta, and cyan components, the complementary color components are red, green, and blue components, and the achromatic color component is a white component.

The aforesaid color signal conversion apparatus of the present invention may further comprise an inverse gamma correction module for performing inverse gamma correction on the three-primary-color signal having been subjected to gamma correction, and then supplying the three-primary-color signal to the first color signal generation module.

In this arrangement, the three-primary-color signal having been subjected to the gamma correction can be subjected to the inverse gamma correction, before performing the above-described process. In the three-primary-color signal having been subjected to the gamma correction, the relationship between the gray level and brightness is nonlinear. Performing, as described above, the inverse gamma correction beforehand, the relationship between the gray level and brightness is caused to be linear. On this account, the signal conversion is performed in a more suitable manner.

The aforesaid color signal conversion apparatus of the present invention may further comprise a gamma correction module for subjecting the n-color signal to the gamma correction.

In the arrangement above, the n-color signal generated as a result of the conversion is subjected to the gamma correction, in line with the gamma characteristics of a display panel on a stage subsequent to the color signal conversion apparatus.

A display unit of the present invention includes: one of the above-described color signal converters; and a display panel having n-color pixels corresponding to the color components of the n-color signal.

According to this arrangement, a display unit in which the adjustment of display colors can be performed using intuitively-understandable parameters is realized thanks to the above-described color signal conversion apparatus.

The aforesaid display unit of the present invention may be arranged in such a manner that, color components of the n-color signal include a first color component, a second color component, and a third color component obtained by performing color mixing of the first and second color components, color components of the m-color signal includes a third equivalent color component that is equivalent in terms of color to the third color component, and in a case where the third equivalent color component of the m-color signal is reproduced by the display panel, auxiliary illumination by means of pixels corresponding to the first and second color components is performed in order to enhance illumination by a pixel corresponding to the third color component.

According to this arrangement, the pixels corresponding to the first and second color components perform the auxiliary illumination, so that the third component is obtained as a result of the color mixing, and the illumination of the pixel corresponding to the third color component is enhanced. With this, even when the brightness of the pixel corresponding to the third color component is insufficient, the third color component is reproduced with a sufficient brightness.

The aforesaid display unit of the present invention may be arranged in such a manner that, the auxiliary illumination is not performed in a case where a gray level of the third equivalent color component of the m-color signal is low, while the auxiliary illumination is performed in a case where the gray level of the third equivalent color component is high.

In general, the third color component obtained as a result of the auxiliary illumination performed by the pixels corresponding to the first and second color components has a color saturation lower than that of the third color component obtained by the illumination of the pixel corresponding to the third color component. On this account, the auxiliary illumination is not performed when the pixel corresponding to the third color component is sufficiently bright, i.e. when the gray level of the third color component is low. With this, the decrease of the color saturation can be avoided.

It is particularly preferable that the first and second color components be red and green while the third color component be yellow. This is because, in a typical image, the yellow color must particularly be thick and have a high brightness.

A color signal conversion program of the present invention realizes, by a computer, one of the foregoing color signal conversion apparatuses. This color signal conversion program can be implemented as a program for causing a computer to operate as the aforesaid module. A computer-readable storage medium of the present invention can store the aforesaid color signal conversion program.

A color display apparatus of the present invention, for displaying a color image, comprises: n-color pixels corresponding to n color components (n≧4) of which the color image is made up, wherein, said n color components include a first color component, a second color component, and a third color component obtained by performing color mixing of the first and second color components, and in a case where the third equivalent color component of the m-color signal is reproduced by the display panel, auxiliary illumination by means of pixels corresponding to the first and second color components is performed in order to enhance illumination by a pixel corresponding to the third color component.

A color display method for displaying a color image is arranged in such a manner that n-color pixels corresponding to n color components (n≧4) of which the color image is made up is used, said n color components include a first color component, a second color component, and a third color component obtained by performing color mixing of the first and second color components, and in a case where the third equivalent color component of the m-color signal is reproduced, auxiliary illumination by means of pixels corresponding to the first and second color components is performed in order to enhance illumination by a pixel corresponding to the third color component.

According to the above-described arrangement and method, the pixels corresponding to the first and second color components perform the auxiliary illumination, so that the third component is obtained as a result of the color mixing, and the illumination of the pixel corresponding to the third color component is enhanced. With this, even when the brightness of the pixel corresponding to the third color component is insufficient, the third color component is reproduced with a sufficient brightness.

The aforesaid color display apparatus of the present invention may be arranged in such a manner that, the auxiliary illumination is not performed in a case where a gray level of the third equivalent color component of the m-color signal is low, while the auxiliary illumination is performed in a case where the gray level of the third equivalent color component is high.

In general, the third color component obtained as a result of the auxiliary illumination performed by the pixels corresponding to the first and second color components has a color saturation lower than that of the third color component obtained by the illumination of the pixel corresponding to the third color component. On this account, the auxiliary illumination is not performed when the pixel corresponding to the third color component is sufficiently bright, i.e. when the gray level of the third color component is low. With this, the decrease of the color saturation can be avoided.

It is particularly preferable that the first and second color components be red and green while the third color component be yellow. This is because, in a typical image, the yellow color must particularly be thick and have a high brightness.

According to the present invention, an RGB or YMC input color signal can be converted to a video signal for a multi-color display apparatus. Furthermore, on the occasion of the conversion, the adjustment of hue, color saturation, and brightness of the colors can be performed, so that the resultant video signal is suitable for the multi-color display apparatus. The present invention is, therefore, suitably adopted to a multi-color display apparatus having pixels corresponding to not less than four colors, such as a monitor for PC, a liquid crystal TV set, a liquid crystal projector, and a display panel of a mobile phone.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A color signal converter that converts a three-primary-color signal to an n-color signal (n≧4), the color signal converter comprising:
   a first color signal generation module for generating, by subjecting the three-primary-color signal to isochromatic conversion, an m-color signal made up of m-color components (m≧n) including respective color components that are equivalent in terms of color to color components of the n-color signal; and
   a second color signal generation module for generating n-color components of the n-color signal, by performing linear combination of all of the m-color components of the m-color signal, the linear combination of all of the m-color components of the m-color signal including,
      allocating the color components of the m-color signal, which are equivalent in terms of color to color components of the n-color signal, as corresponding color components of the n-color signal, and
      allocating redundant ones of the m-color components to suitable color components of the n-color signal, the redundant ones of the m-color components being different from the color components of the m-color signal, which are equivalent in terms of color to color components of the n-color signal, wherein
         in the color components of the m-color signal, at most three color components are selected in accordance with the three-primary-color signal.

2. The color signal converter as defined in claim 1, further comprising a coefficient change module for changing coefficients of the linear combination performed by the second color signal generation module.

3. The color signal converter as defined claim 1, wherein, in the first color signal generation module, said m-color components are made up of: primary color components of the three-primary-color signal; complementary color components corresponding to the primary color components, respectively; and an achromatic color component.

4. The color signal converter as defined in claim 1, wherein, in the first color signal generation module, said m-color components are made up of: primary color components of the three-primary-color signal; complementary color components corresponding to the primary color components, respectively; neutral color components between the primary color components and the complementary color components; and an achromatic color component.

5. The color signal converter as defined in claim 1, further comprising an inverse gamma correction module for performing inverse gamma correction on the three-primary-color signal having been subjected to gamma correction, and then supplying the three-primary-color signal to the first color signal generation module.

6. The color signal converter as defined in claim 1, further comprising a gamma correction module for subjecting the n-color signal to the gamma correction.

7. A display unit, comprising:
   the color signal converter defined in claim 1; and
   a display panel having n-color pixels corresponding to the color components of the n-color signal.

8. A non-transitory computer-readable storage medium storing a color signal conversion program for realizing the color signal converter defined in claim 1 by a computer, the color signal conversion program causing the computer to function as the first color signal generation module and the second color signal generation module.

9. The color signal as defined in claim 1, wherein the second color signal generation module allocates colors of the three-primary-color signal with colors of an image display panel by adjusting matrix coefficients associated with the linear combination of the m-color components.

10. The color signal converter as defined in claim 3, wherein, the primary color components are red, green, and blue components, the complementary color components are yellow, magenta, and cyan components, and the achromatic color component is a white component.

11. The color signal converter as defined in claim 3, wherein, the primary color components are yellow, magenta, and cyan components, the complementary color components are red, green, and blue components, and the achromatic color component is a white component.

12. The display unit as defined in claim 7,
   wherein,
   the n-color components of the n-color signal include a first color component, a second color component, and a third color component obtained by performing color mixing of the first and second color components,
   the m-color components of the m-color signal includes a third equivalent color component that is equivalent in terms of color to the third color component, and
   in a case where the third equivalent color component of the m-color signal is reproduced by the display panel, auxiliary illumination by means of pixels corresponding to the first and second color components is performed in order to enhance illumination by a pixel corresponding to the third color component.

13. The display unit as defined in claim 12, wherein, the auxiliary illumination is not performed in a case where a gray level of the third equivalent color component of the m-color signal is low, while the auxiliary illumination is performed in a case where the gray level of the third equivalent color component is high.

14. The display unit as defined in claim 12, wherein, the first color component is red, the second color component is green, and the third color component is yellow.

15. A color signal conversion method for converting a three-primary-color signal to an n-color signal (n≧4), the method comprising the steps of:
   generating, by subjecting the three-primary-color signal to isochromatic conversion, an m-color signal made up of m-color components (m≧n) including respective color components that are equivalent in terms of color to color components of the n-color signal; and
   generating n-color components of the n-color signal by performing linear combination of all of the m-color components of the m-color signal, the linear combination of all of the m-color components of the m-color signal including,
      allocating the color components of the m-color signal, which are equivalent in terms of color to color components of the n-color signal, as corresponding color components of the n-color signal,
      allocating redundant ones of the m-color components to suitable color components of the n-color signal, the redundant ones of the m-color components being different from the color components of the m-color signal, which are equivalent in terms of color to color components of the n-color signal, and selecting, in accordance with the three-primary-color signal, at most three color components from the color components of the m-color signal.

16. A color display apparatus for displaying a color image, comprising:

n-color pixels corresponding to n color components (n≧4) of which the color image is made up, wherein,
said n-color components include a first color component, a second color component, and a third color component obtained by performing color mixing of only the first and second color components, said n-color components being a linear combination of all m-color components of an m-color signal, wherein the m-color components are gray levels generated by classifying a three-primary-color signal into patterns according to a magnitude relation pattern of the three-primary color signal and carrying out respective arithmetic processes for the patterns,
in a case where the third equivalent color component of the n-color signal is reproduced by the display panel, auxiliary illumination by means of pixels corresponding to the first and second color components is performed in order to enhance illumination by a pixel corresponding to the third color component, and
the linear combination of all of the m-color components of the m-color signal includes allocating redundant ones of the m-color components to suitable color components of the n-color signal, the redundant ones of the m-color components being different from color components of the m-color signal, which are equivalent in terms of color to color components of the n-color signal.

17. The color display apparatus as defined in claim 16, wherein, the auxiliary illumination is not performed in a case where a gray level of the third equivalent color component of the m-color signal is low, while the auxiliary illumination is performed in a case where the gray level of the third equivalent color component is high.

18. The color display apparatus as defined in claim 16, wherein, the first color component is red, the second color component is green, and the third color component is yellow.

19. The color display apparatus of claim 16, wherein the third color component is a color component other than an achromatic color component.

20. The color display apparatus of claim 16, wherein the auxiliary illumination is realized by adjusting coefficients by which the first and second color components are multiplied in a conversion matrix for converting the color components.

21. A color display method for displaying a color image, the method comprising:

generating n-color components (n≧4) of an n-color signal by performing linear combination of all m-color components of an m-color signal (m≧n), the m-color components being gray levels generated by classifying a three-primary-color signal into patterns according to a magnitude relation pattern of the three-primary-color signal and carrying out respective arithmetic processes for the patterns;
color mixing only a first color component and a second color component of the n-color signal to generate a third color component;
performing auxiliary illumination of pixels corresponding to the first and second color components to enhance illumination by a pixel corresponding to the third color component if the third equivalent color component of the n-color signal is to be reproduced in the color image; and
generating the color image using n-color pixels corresponding to the n-color components, wherein
the linear combination of all of the m-color components of the m-color signal includes allocating redundant ones of the m-color components to suitable color components of the n-color signal, the redundant ones of the m-color components being different from color components of the m-color which are equivalent in terms of color to color components of the n-color signal.

22. The color display apparatus of claim 21, wherein the third color component is a color component other than an achromatic color component.

23. The color display apparatus of claim 21, wherein the auxiliary illumination is realized by adjusting coefficients by which the first and second color components are multiplied in a conversion matrix for converting the color components.

24. The color display apparatus as defined in claim 21, wherein, the first color component is red, the second color component is green, and the third color component is yellow.

* * * * *